US012585843B2

(12) United States Patent
Reid et al.

(10) Patent No.: US 12,585,843 B2
(45) Date of Patent: Mar. 24, 2026

(54) AIRCRAFT WIRE ROUTING TO ACCOUNT FOR ELECTROMAGNETIC DISTURBANCES

(71) Applicant: THE BOEING COMPANY, Chicago, IL (US)

(72) Inventors: Marissa Reid, Seattle, WA (US); Micah Lee Goldade, Seattle, WA (US); Adolfo Alejandro Martinez, St. Charles, MO (US); Quang H. Nguyen, Kent, WA (US)

(73) Assignee: THE BOEING COMPANY, Arlington, VA (US)

( * ) Notice: Subject to any disclaimer, the term of this patent is extended or adjusted under 35 U.S.C. 154(b) by 921 days.

(21) Appl. No.: 17/650,271

(22) Filed: Feb. 8, 2022

(65) Prior Publication Data

US 2022/0391557 A1      Dec. 8, 2022

Related U.S. Application Data

(60) Provisional application No. 63/196,011, filed on Jun. 2, 2021.

(51) Int. Cl.
G06F 30/18 (2020.01)
B64D 47/00 (2006.01)
(Continued)

(52) U.S. Cl.
CPC ............. G06F 30/20 (2020.01); B64D 47/00 (2013.01); G06F 30/15 (2020.01); G06F 2113/16 (2020.01)

(58) Field of Classification Search
CPC ........ G06F 21/567; G06F 21/86; G06F 3/011; G06F 30/30; G06F 1/035; G06F 1/182;
(Continued)

(56) References Cited

U.S. PATENT DOCUMENTS 6,879,941 B1      4/2005 Ehrenberg et al.
8,290,638 B2 *  10/2012 Eicke ................... G01C 23/005
                                                              701/3
(Continued)

FOREIGN PATENT DOCUMENTS

EP               1831706 B1      4/2019
WO      WO-2020148344 A1 *   7/2020      ......... G01R 29/0871

OTHER PUBLICATIONS

Capraro, Gerard T. et al., "Design of Wire Routing for EMC," 1979 IEEE International Symposium on Electromagnetic Compatibility, IEEE, Oct. 9, 1979, pp. 1-8.

(Continued)

*Primary Examiner* — Rehana Perveen
*Assistant Examiner* — John David Hagler
(74) *Attorney, Agent, or Firm* — Moore IP Law

(57) ABSTRACT

A computing device includes a memory storing instructions. The computing device also includes one or more processors coupled to the memory and configured to execute the instructions to perform operations including obtaining data specifying a wire to be routed; selecting a wire bundle as a candidate for routing the wire; determining bundle parameters; generating a transmission line model to determine an estimated effect of an electromagnetic disturbance on the wire bundle; performing a comparison of the estimated effect of the electromagnetic disturbance to an acceptance criterion; and generating output indicating whether, based on the comparison, a particular routing of the wire satisfies a design specification.

18 Claims, 12 Drawing Sheets

(51) Int. Cl.

| | |
|---|---|
| *G06F 30/15* | (2020.01) |
| *G06F 30/20* | (2020.01) |
| *H02G 1/06* | (2006.01) |
| *G06F 113/16* | (2020.01) |

(58) Field of Classification Search
CPC .......... G06F 17/00; G06F 21/75; G06F 3/014;
G06F 3/0482; G06F 3/04847
See application file for complete search history.

(56) References Cited

U.S. PATENT DOCUMENTS

| | | | |
|---|---|---|---|
| 2007/0050178 A1* | 3/2007 | Linzey | G06Q 10/04 703/2 |
| 2021/0302277 A1* | 9/2021 | Niebler | G05B 23/0235 |
| 2025/0220403 A1* | 7/2025 | Smith | H04L 45/20 |

OTHER PUBLICATIONS

Extended European Search Report for Application No. 22176727.0 dated Nov. 17, 2022, 14 pgs.

Kley, Thomas, "Optimized Single-Braided Cable Shields," IEEE Transactions on Electromagnetic Compatibility, vol. 25, No. 1, Feb. 1993, pp. 1-9.

Paul, Clayton R., "Analysis of Multiconductor Transmission Lines," IEEE Press, Wiley-Interscience, A John Wiley & Sons, Inc., Publication, 2008, pp. 1-821.

Vance, E.F., "Shielding Effectiveness of Braided Wire Shields," Interaction Note 172, Apr. 1974, Standford Research Institute, Menlo Park, California, pp. 1-39.

Communication pursuant to Articie 94(3) EPC dated Jan. 2, 2026, pp. 1-14.

* cited by examiner

900

| Cable Inductance 902 | | | | |
|---|---|---|---|---|
| Self (H/m) | 1.2738E-008 | 1.2744E-008 | 1.2774E-008 | 1.2758E-008 |
| Mutual (H/m) | | 2 | 3 | 4 |
| 1 | | 3.8144E-009 | 1.9992E-009 | 3.8220E-009 |
| 2 | | | 3.8304E-009 | 1.9984E-009 |
| 3 | | | | 3.8274E-009 |

| Cable Capacitance 904 | | | | |
|---|---|---|---|---|
| Conductor to Reference (F/m) | 1.2330E-009 | 1.2330E-009 | 1.2330E-009 | 1.2330E-009 |
| Conductor to Conductor (F/m) | | 2 | 3 | 4 |
| 1 | | 3.8144E-010 | 1.9419E-012 | 8.3897E-010 |
| 2 | | | 8.3898E-010 | 1.9403E-012 |
| 3 | | | | 8.3904E-010 |

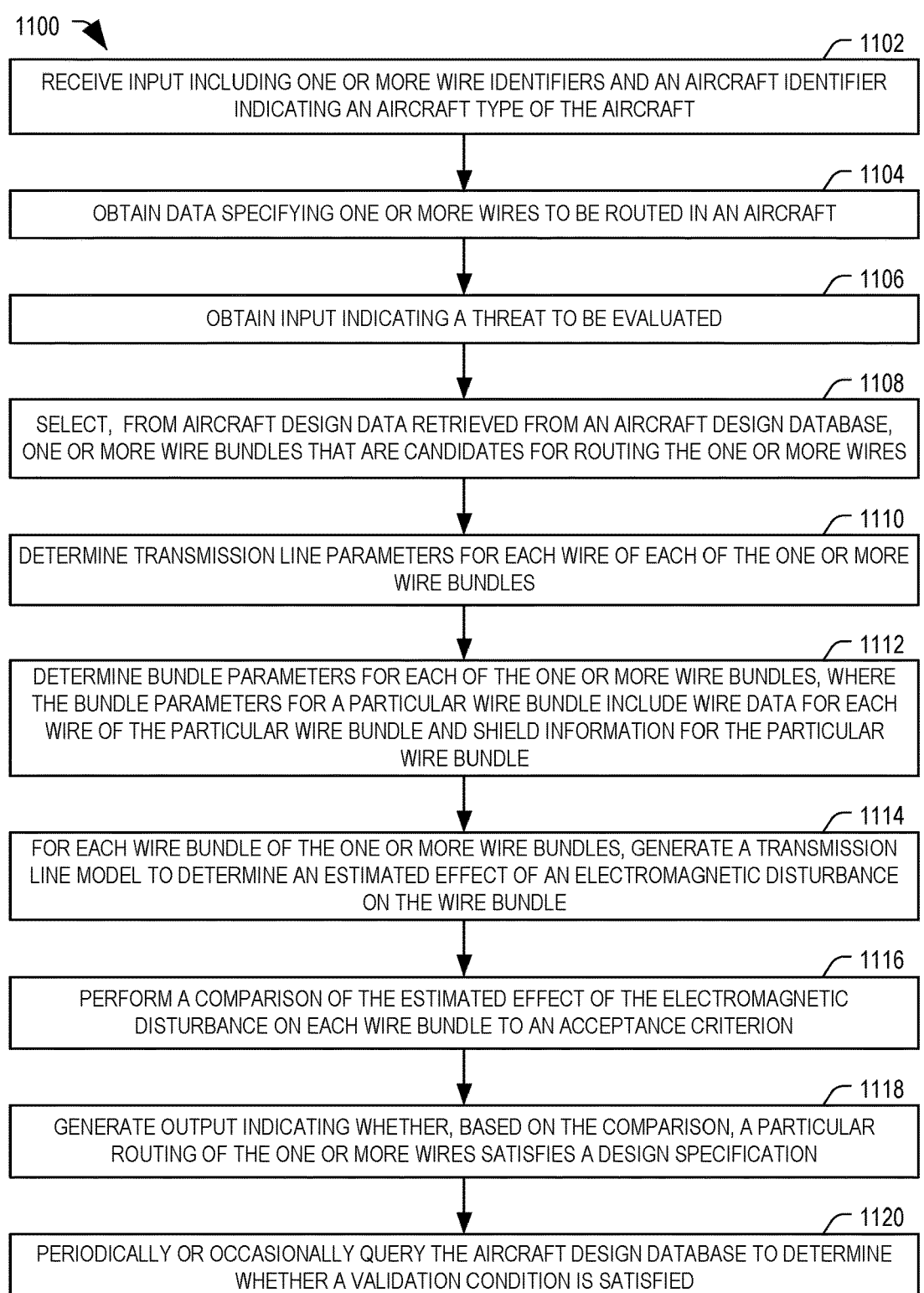

1100

1102
RECEIVE INPUT INCLUDING ONE OR MORE WIRE IDENTIFIERS AND AN AIRCRAFT IDENTIFIER INDICATING AN AIRCRAFT TYPE OF THE AIRCRAFT

1104
OBTAIN DATA SPECIFYING ONE OR MORE WIRES TO BE ROUTED IN AN AIRCRAFT

1106
OBTAIN INPUT INDICATING A THREAT TO BE EVALUATED

1108
SELECT, FROM AIRCRAFT DESIGN DATA RETRIEVED FROM AN AIRCRAFT DESIGN DATABASE, ONE OR MORE WIRE BUNDLES THAT ARE CANDIDATES FOR ROUTING THE ONE OR MORE WIRES

1110
DETERMINE TRANSMISSION LINE PARAMETERS FOR EACH WIRE OF EACH OF THE ONE OR MORE WIRE BUNDLES

1112
DETERMINE BUNDLE PARAMETERS FOR EACH OF THE ONE OR MORE WIRE BUNDLES, WHERE THE BUNDLE PARAMETERS FOR A PARTICULAR WIRE BUNDLE INCLUDE WIRE DATA FOR EACH WIRE OF THE PARTICULAR WIRE BUNDLE AND SHIELD INFORMATION FOR THE PARTICULAR WIRE BUNDLE

1114
FOR EACH WIRE BUNDLE OF THE ONE OR MORE WIRE BUNDLES, GENERATE A TRANSMISSION LINE MODEL TO DETERMINE AN ESTIMATED EFFECT OF AN ELECTROMAGNETIC DISTURBANCE ON THE WIRE BUNDLE

1116
PERFORM A COMPARISON OF THE ESTIMATED EFFECT OF THE ELECTROMAGNETIC DISTURBANCE ON EACH WIRE BUNDLE TO AN ACCEPTANCE CRITERION

1118
GENERATE OUTPUT INDICATING WHETHER, BASED ON THE COMPARISON, A PARTICULAR ROUTING OF THE ONE OR MORE WIRES SATISFIES A DESIGN SPECIFICATION

1120
PERIODICALLY OR OCCASIONALLY QUERY THE AIRCRAFT DESIGN DATABASE TO DETERMINE WHETHER A VALIDATION CONDITION IS SATISFIED

INPUT/OUTPUT
DEVICE(S) 1470

COMPUTING DEVICE 1410

SYSTEM MEMORY 1430

OPERATING SYSTEM 1432

APPLICATIONS
(E.G., INSTRUCTIONS) 1434

QUERY GENERATOR 202

PARAMETER CALCULATOR 222

MODEL GENERATOR 224

COMPARATOR 238

VALIDATOR 256

PROGRAM DATA 1436

TRANSMISSION LINE MODEL 234

STORAGE
DEVICE(S) 1440

INPUT/OUTPUT
INTERFACE(S) 1450

PROCESSOR(S) 260

COMMUNICATIONS
INTERFACE(S) 1460

DEVICE(S) OR CONTROLLER(S) 1480

AIRCRAFT DESIGN DATABASE 204

AIRCRAFT WIRE ROUTING TO ACCOUNT FOR ELECTROMAGNETIC DISTURBANCES

CROSS-REFERENCE TO RELATED APPLICATIONS

The present application claims the benefit of U.S. Provisional Patent Application No. 63/196,011 entitled "AIRCRAFT WIRE ROUTING TO ACCOUNT FOR ELECTROMAGNETIC DISTURBANCES," filed Jun. 2, 2021, the contents of which are incorporated by reference in their entirety.

FIELD OF THE DISCLOSURE

The present disclosure is generally related to routing wires in an aircraft in a manner that takes into account electromagnetic disturbances.

BACKGROUND

Aircraft may be exposed to various electromagnetic disturbances during operation, such as lightning strikes or high-altitude electromagnetic pulses. Aircraft designers consider the impact of such electromagnetic disturbances when making various design decisions, such as when selecting materials or designing circuits. One aspect of aircraft design where electromagnetic disturbances are considered is the bundling and routing of wires. For example, when a wired connection is needed between two points (e.g., to connect a first line replaceable unit (LRU) to another LRU), a designer may determine how to route one or more wires of the wired connection in a manner that satisfies various design specifications, such as a maximum current or maximum voltage expected to be experienced at any point along the wired connection as a result of a particular electromagnetic disturbance.

Modern commercial aircraft can include many miles of wiring routed to make thousands of individual wire runs that are grouped into hundreds of wire bundles. The planning and routing of each of these wires can be challenging. Additionally, various aspects of an aircraft's design can change during planning, manufacturing, or post-production (e.g., while the aircraft is in service), and such changes can impact wire routing decisions that can entail reevaluation of each affected wire run.

SUMMARY

In a particular implementation, a computing device includes a memory that stores instructions. The computing device also includes one or more processors coupled to the memory and configured to execute the instructions to perform operations to route one or more wires. The operations include obtaining data specifying one or more wires to be routed in an aircraft and selecting, from aircraft design data retrieved from an aircraft design database, one or more wire bundles that are candidates for routing the one or more wires. The operations further include determining bundle parameters for each of the one or more wire bundles, where the bundle parameters for a particular wire bundle include wire data for each wire of the particular wire bundle and shield information for the particular wire bundle. The operations also include, for each wire bundle of the one or more wire bundles, generating a transmission line model to determine an estimated effect of an electromagnetic disturbance on the wire bundle. The operations further include performing a comparison of the estimated effect of the electromagnetic disturbance on each wire bundle to an acceptance criterion. The operations also include generating output indicating whether, based on the comparison, a particular routing of the one or more wires satisfies a design specification.

In another particular implementation, a non-transitory computer-readable storage device stores instructions that are executable by one or more processors to cause the one or more processors to perform operations to route one or more wires. The operations include obtaining data specifying one or more wires to be routed in an aircraft and selecting, from aircraft design data retrieved from an aircraft design database, one or more wire bundles that are candidates for routing the one or more wires. The operations also include determining bundle parameters for each of the one or more wire bundles, where the bundle parameters for a particular wire bundle include wire data for each wire of the particular wire bundle and shield information for the particular wire bundle. The operations further include, for each wire bundle of the one or more wire bundles, generating a transmission line model to determine an estimated effect of an electromagnetic disturbance on the wire bundle. The operations also include performing a comparison of the estimated effect of the electromagnetic disturbance on each wire bundle to an acceptance criterion. The operations further include generating output indicating whether, based on the comparison, a particular routing of the one or more wires satisfies a design specification.

In another particular implementation, a method includes obtaining, by one or more processors, data specifying one or more wires to be routed in an aircraft and selecting, by the one or more processors from aircraft design data retrieved from an aircraft design database, one or more wire bundles that are candidates for routing the one or more wires. The method also includes determining, by the one or more processors, bundle parameters for each of the one or more wire bundles, where the bundle parameters for a particular wire bundle include wire data for each wire of the particular wire bundle and shield information for the particular wire bundle. The method further includes, for each wire bundle of the one or more wire bundles, generating, by the one or more processors, a transmission line model to determine an estimated effect of an electromagnetic disturbance on the wire bundle. The method also includes performing, by the one or more processors, a comparison of the estimated effect of the electromagnetic disturbance on each wire bundle to an acceptance criterion. The method further includes generating, by the one or more processors, output indicating whether, based on the comparison, a particular routing of the one or more wires satisfies a design specification.

The features, functions, and advantages described herein can be achieved independently in various implementations or may be combined in yet other implementations, further details of which can be found with reference to the following description and drawings.

3

Figures 3, 4:
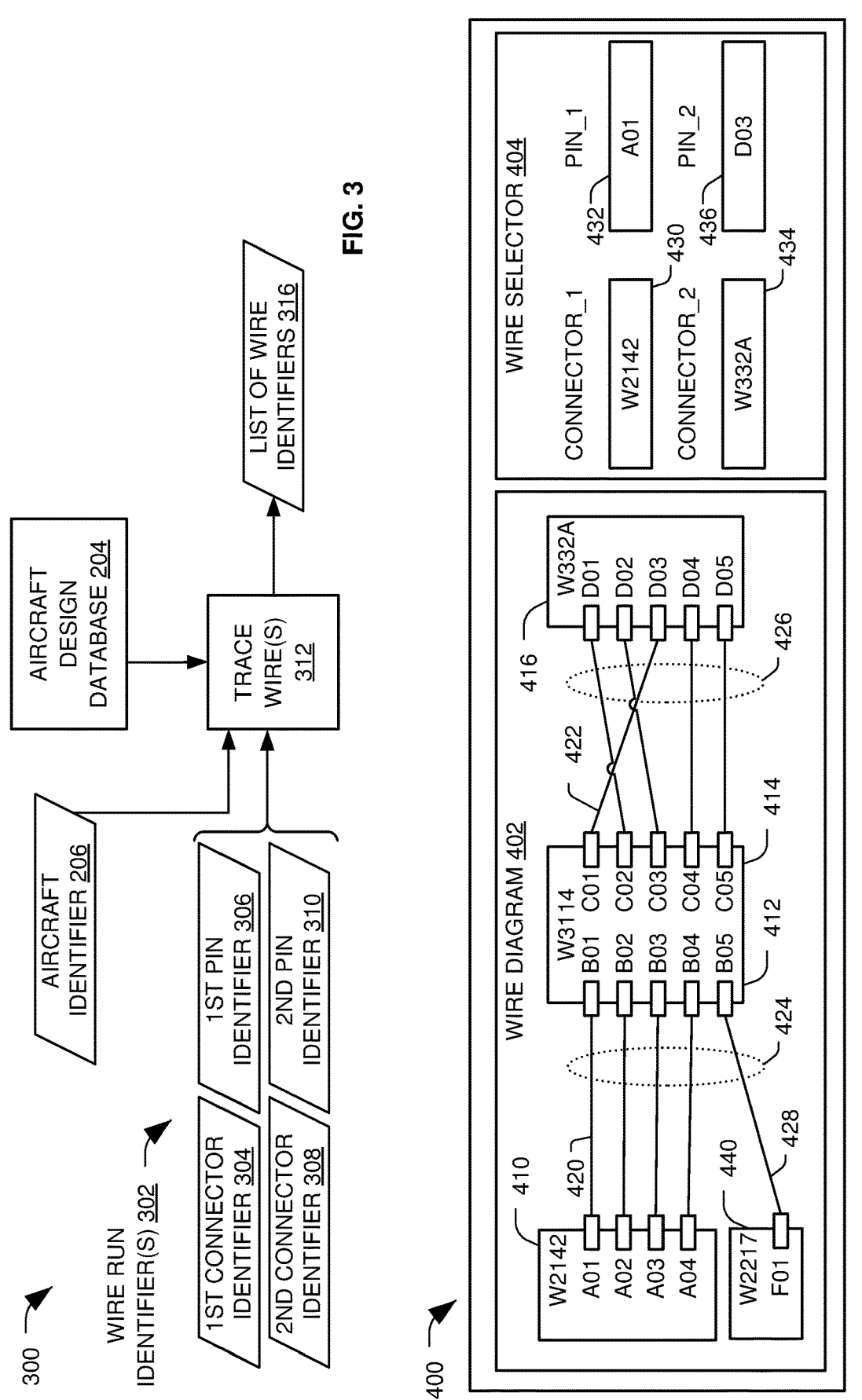
FIG. 3 is a flow chart that illustrates an example of a particular aspect of the method of routing wires in an aircraft of FIG. 1.

FIG. 4 is a diagram that illustrates an example of a user interface display showing wire information.

Figure 1:
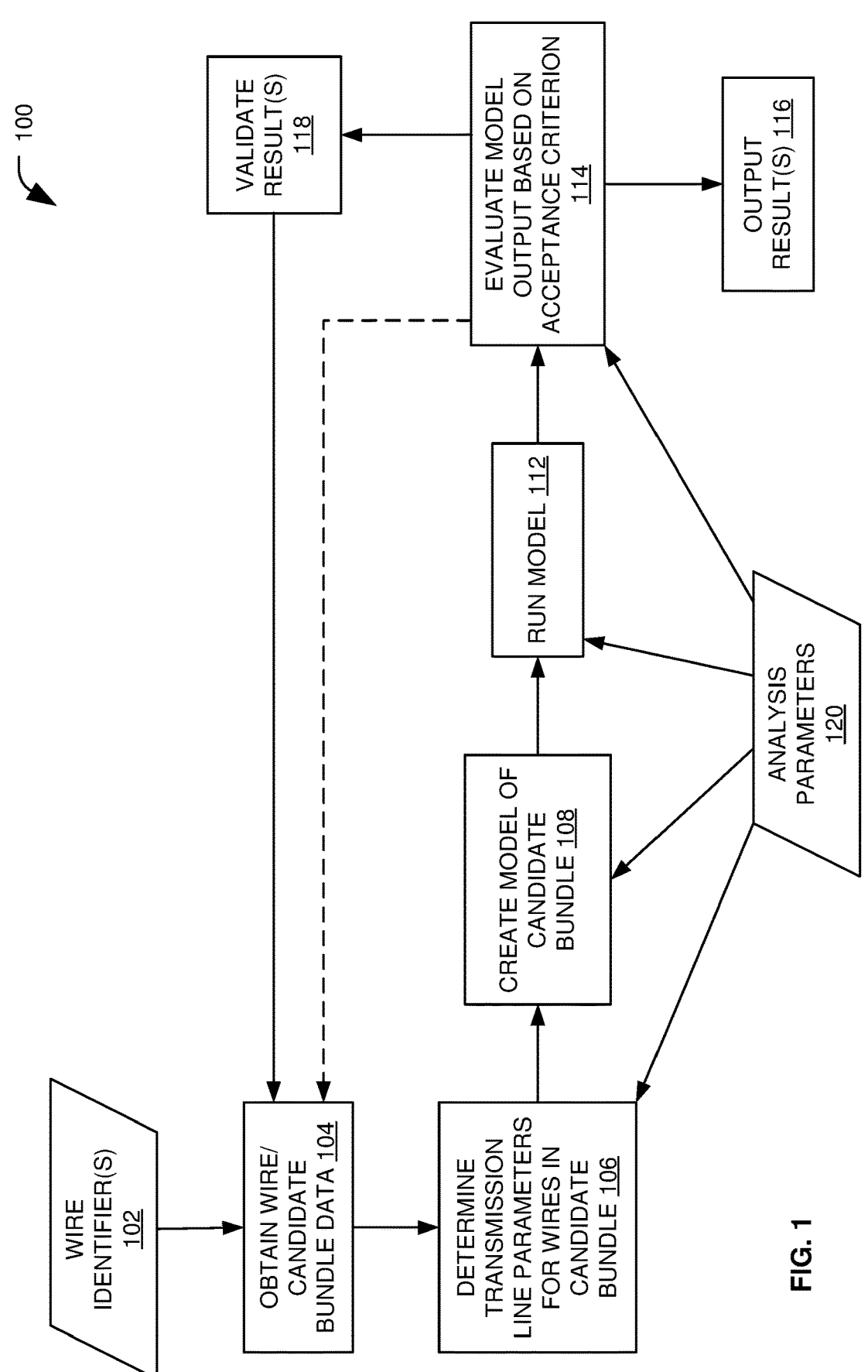
FIG. 1 is a flow chart that illustrates an example of a method of routing wires in an aircraft.
Figure 5:
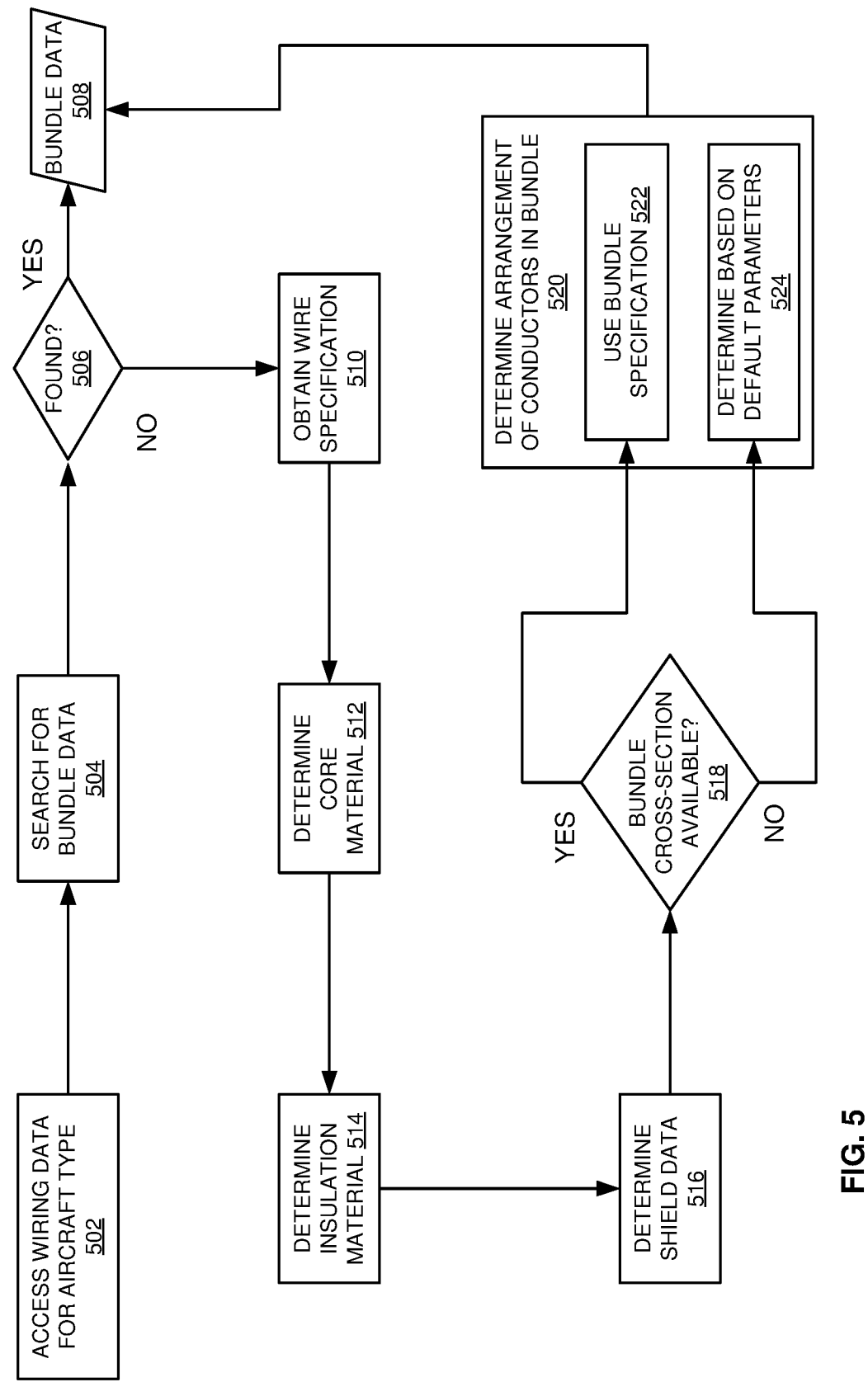

FIG. 5 is a flow chart that illustrates an example of another particular aspect of the method of routing wires in an aircraft of FIG. 1.

Figure 6:
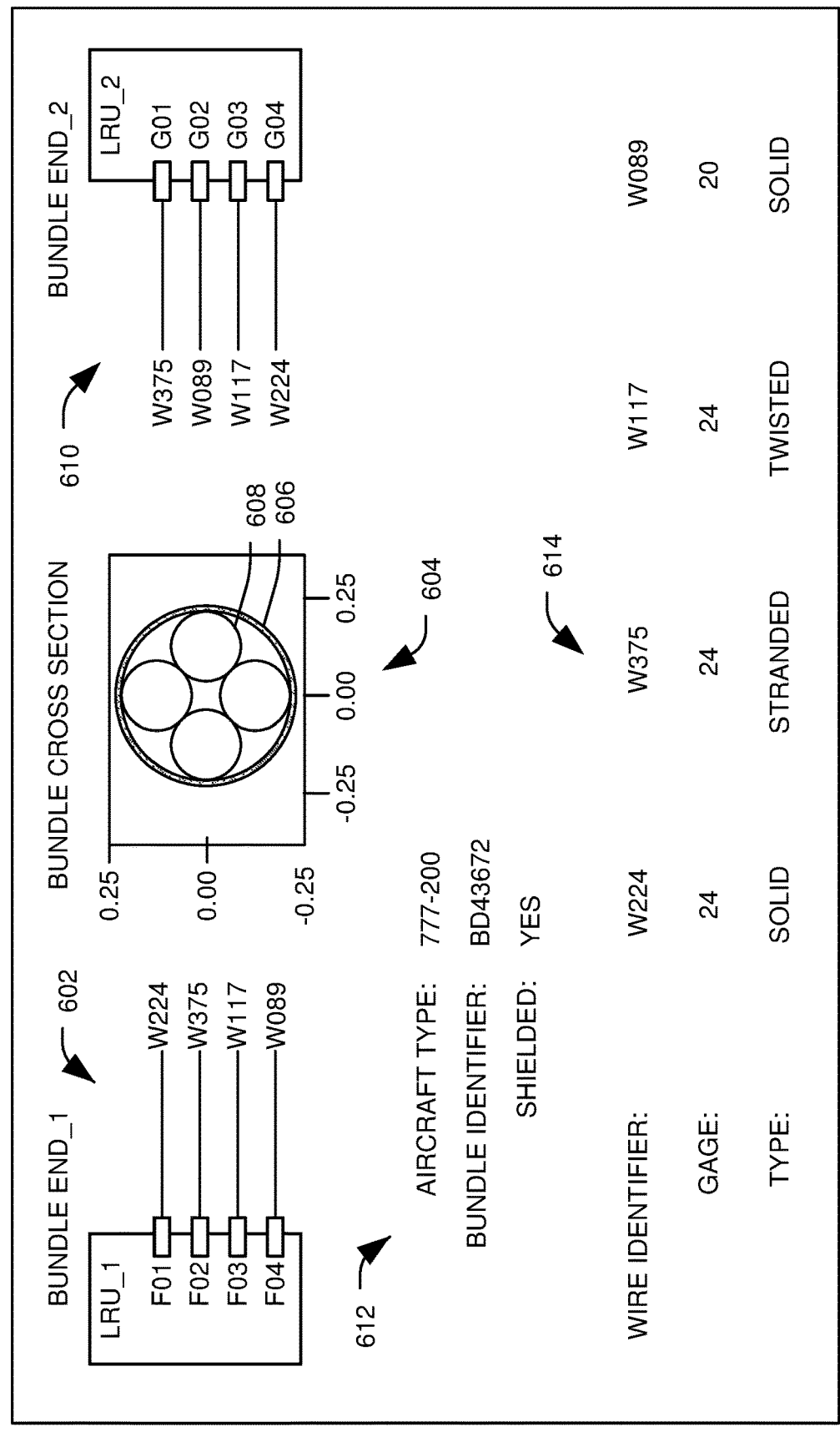

FIG. 6 is a diagram that illustrates an example of a user interface display showing bundle data.

Figure 7:
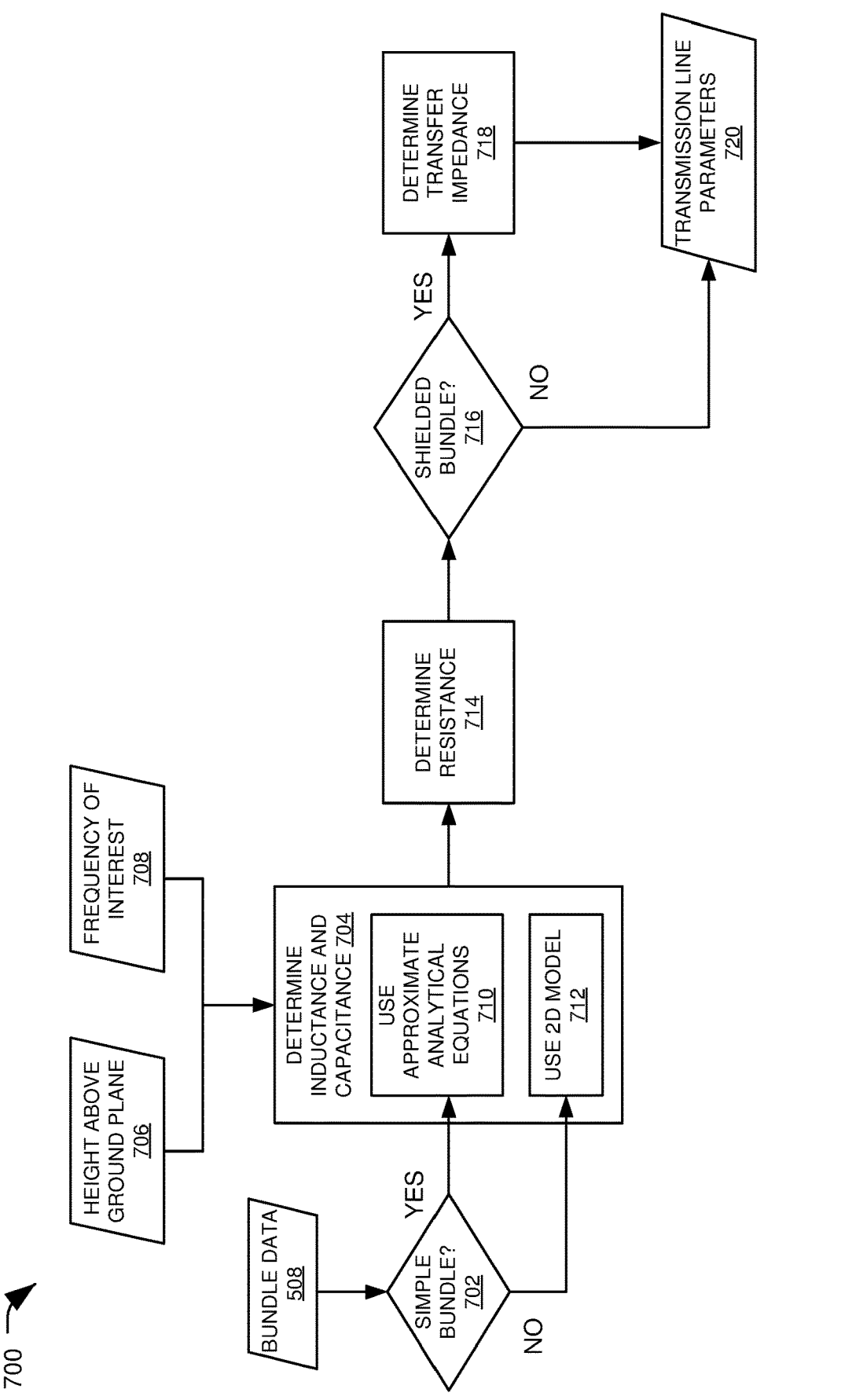

FIG. 7 is a flow chart that illustrates an example of yet another particular aspect of the method of routing wires in an aircraft of FIG. 1.

Figure 8:
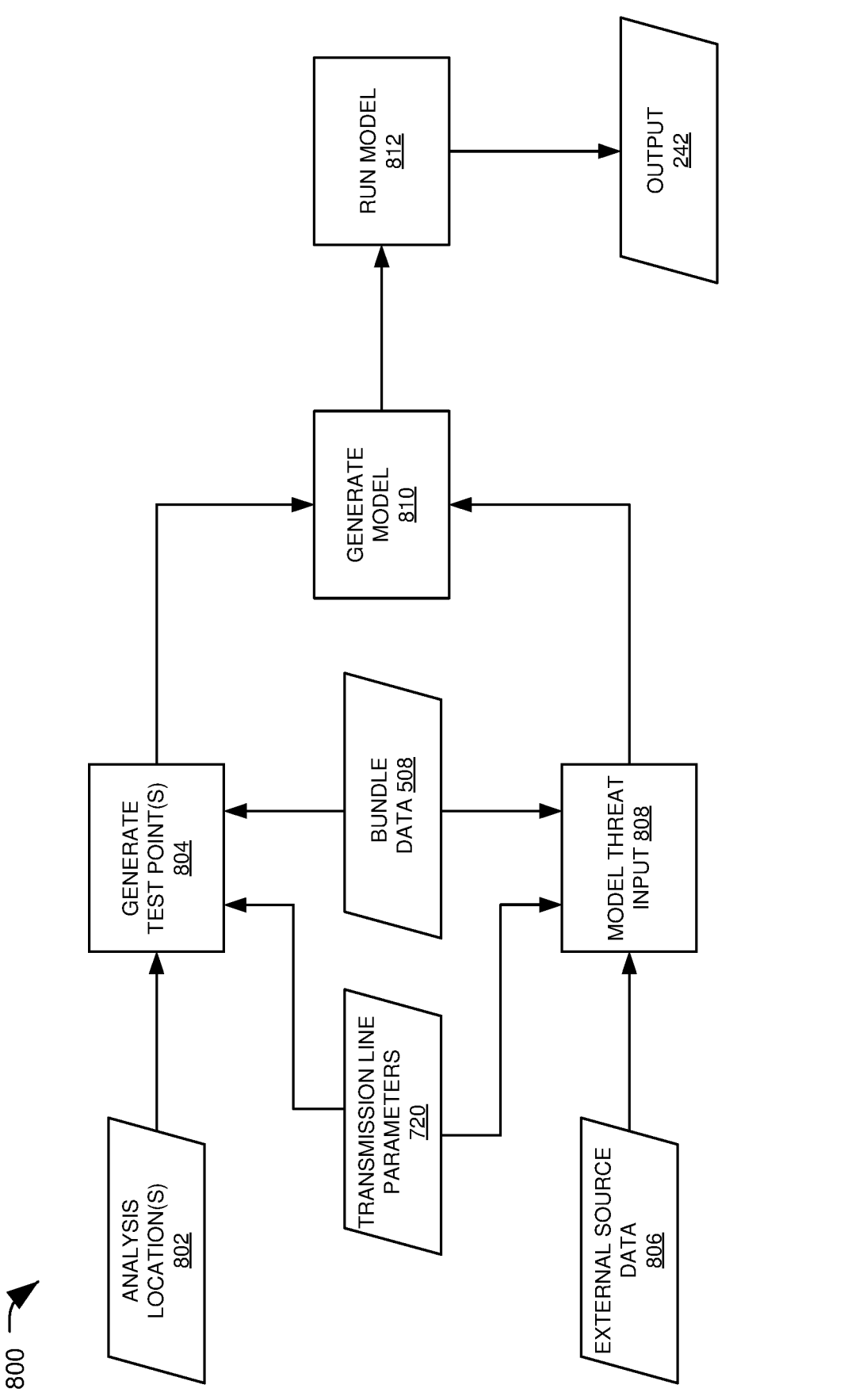

FIG. 8 is a flow chart that illustrates an example of still another particular aspect of the method of routing wires in an aircraft of FIG. 1.

Figure 9:
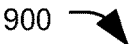

FIG. 9 is a diagram that illustrates an example of a user interface display showing transmission line parameters of a wire bundle.

Figure 10:
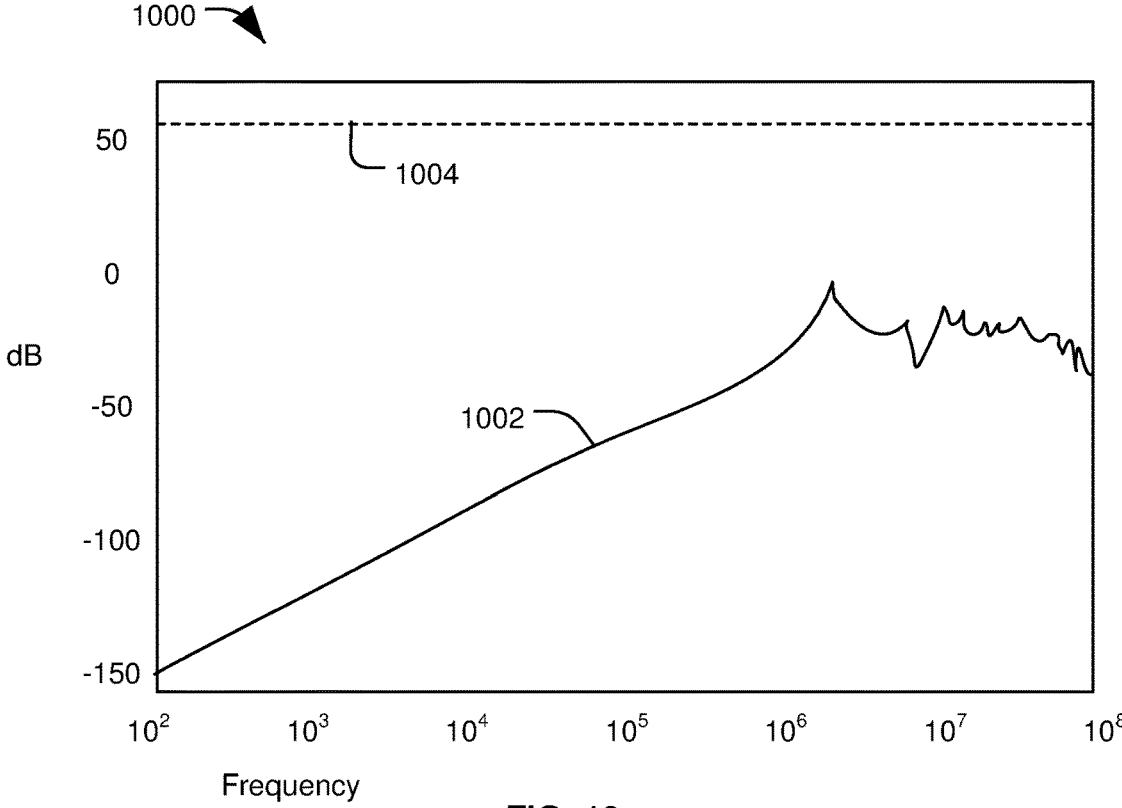

FIG. 10 is a diagram that illustrates an example of a user interface display showing output of a transmission line model as compared to an acceptance criterion.

FIG. 11 is a flow chart that illustrates aspects of the method of routing wires in an aircraft of FIG. 1.

Figure 12:
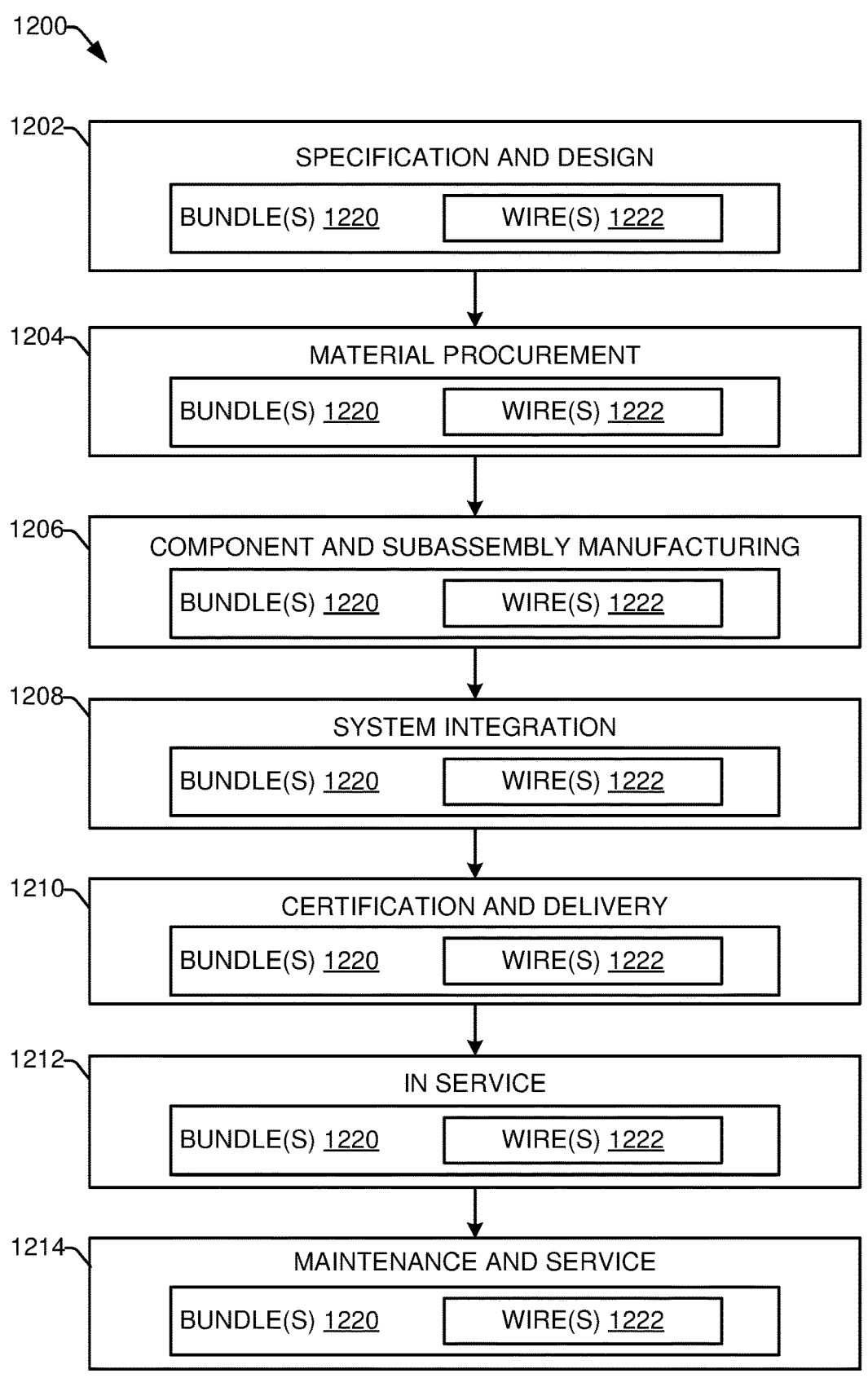

FIG. 12 is a flow chart illustrating a life cycle of an aircraft that includes the wires and wire bundles routed using the method of FIG. 1.

Figure 13:
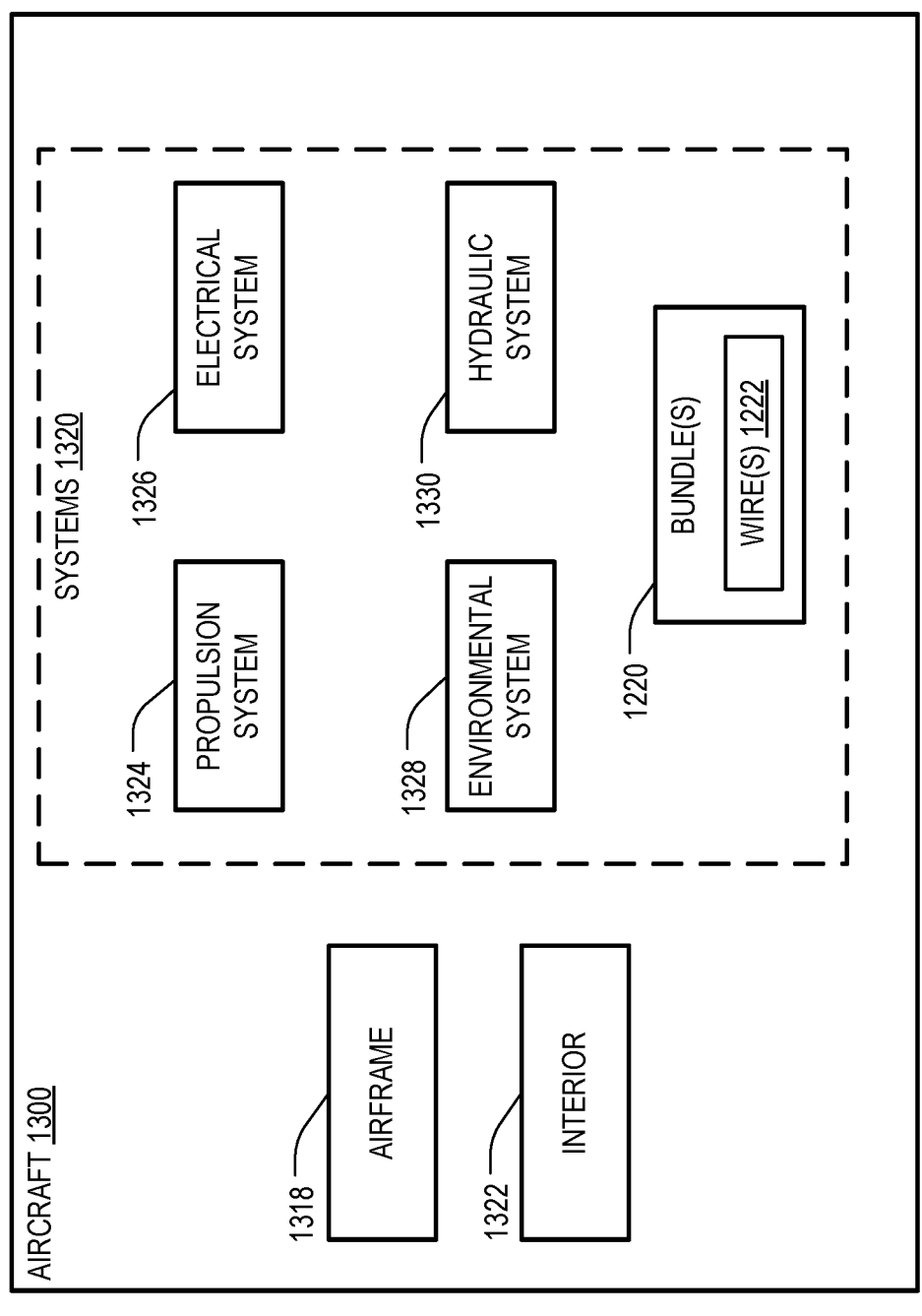

FIG. 13 is a block diagram of an aircraft that includes the wires and wire bundles routed using the method of FIG. 1.

Figure 14:
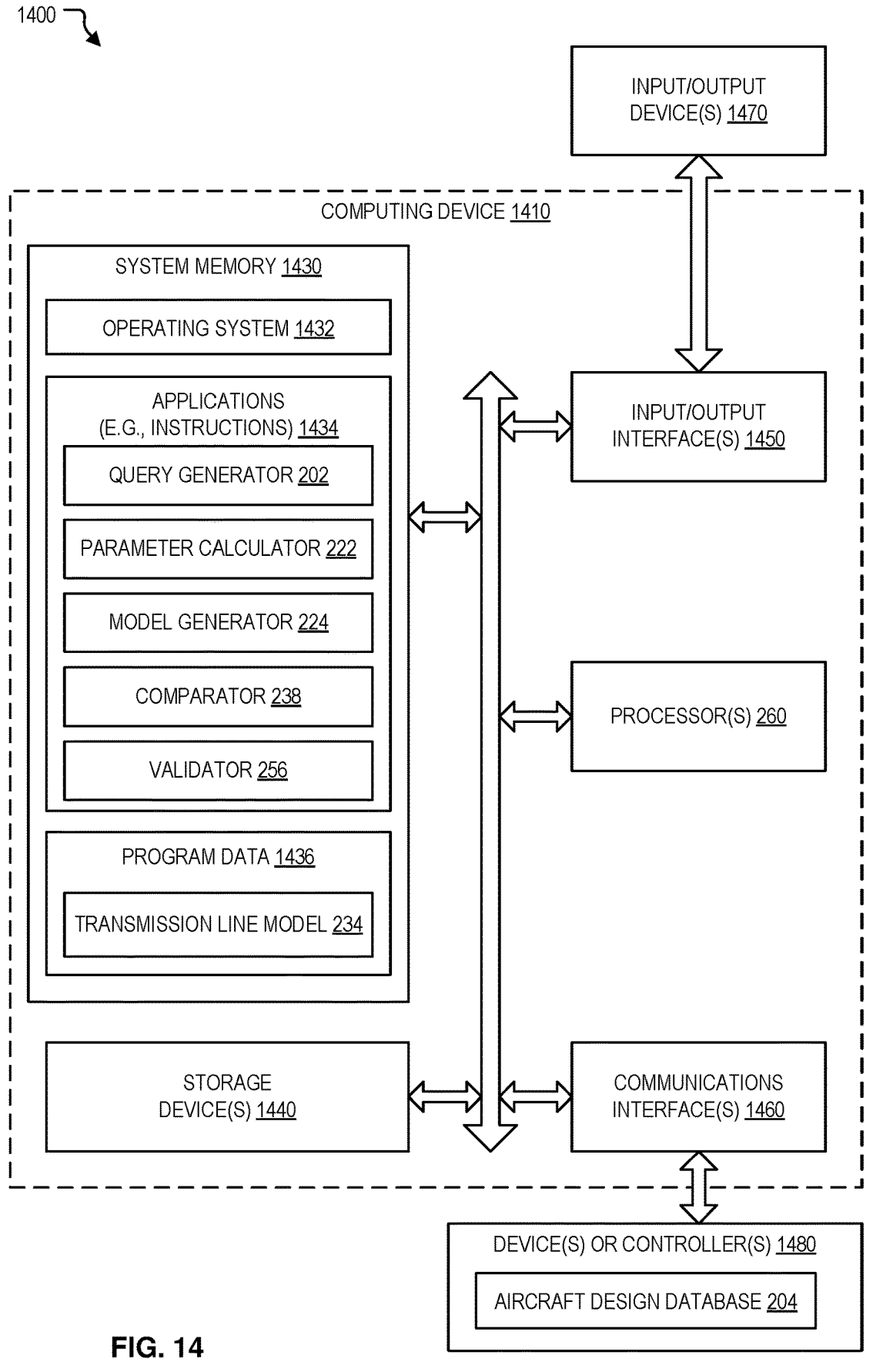

FIG. 14 is a block diagram of a computing environment including a computing device configured to support aspects of computer-implemented methods and computer-executable program instructions (or code) according to the present disclosure.

DETAILED DESCRIPTION

In a particular aspect, wire analysis is performed using a model-based approach using data retrieved from an authoritative aircraft design database. For example, a computing system configured to perform wire analysis can query the aircraft design database to gather wire specifications, to trace wires along wire runs, and to gather wire bundle data and other data relevant to the wire analysis. Gathering this data by querying the aircraft design database reduces the risk that the data used for wire analysis is out of date or incorrect. Additionally, gathering this data directly from the aircraft design database improves traceability, which reduces time spent during confirmation, quality control, and/or certification of aircraft that rely on the wire analysis. Obtaining the design data directly from the aircraft design database also reduces the risk of errors (e.g., transcription errors) due to manual processes to evaluate wire routes.

In addition to the above, aspects disclosed herein reduce computing resource utilization for performing wire analysis while simultaneously improving the reliability of wire routing decisions that are based on the wire analysis. For example, a wire analysis result (e.g., indicating a wire routing decision) can be tied to the specific design data in the aircraft design database that is used to generate the result. In this example, if the design data in the aircraft design database that is used to generate the result is subsequently changed, the result (e.g., the wire routing decision) can be marked invalid or can be automatically updated or validated based on the updated design data in the aircraft design database. In this example, the result (e.g., the wire routing decision) is either validated or invalidated upon an update to the design data, and if the result is invalidated, a new wire analysis can be performed to recommend changes to the wire routing decision. As another example, after many changes have been made to the aircraft design database, such as due to iterative improvements, change orders, or other incremental changes, it can be difficult to detect which wire routing decisions may be impacted. Rather than reconfirm each routing decision, aspects disclosed herein can identify which bundles or wires are affected by the changed design data in the aircraft design database and only recheck the affected bundles or wires, which saves significant time and resources (e.g., computing time) relative to rechecking all of the bundles and wires of the aircraft.

Particular implementations are described herein with reference to the drawings. In the description, common features are designated by common reference numbers throughout the drawings. The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts one or more wire identifiers ("wire identifier(s)" 102 in FIG. 1), which indicates that in some implementations a single wire identifier 102 is used and in other implementations multiple wire identifiers 102 are used. For ease of reference herein, such features are generally introduced as "one or more" features and are subsequently referred to in the singular or optional plural (as indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Figure 2:
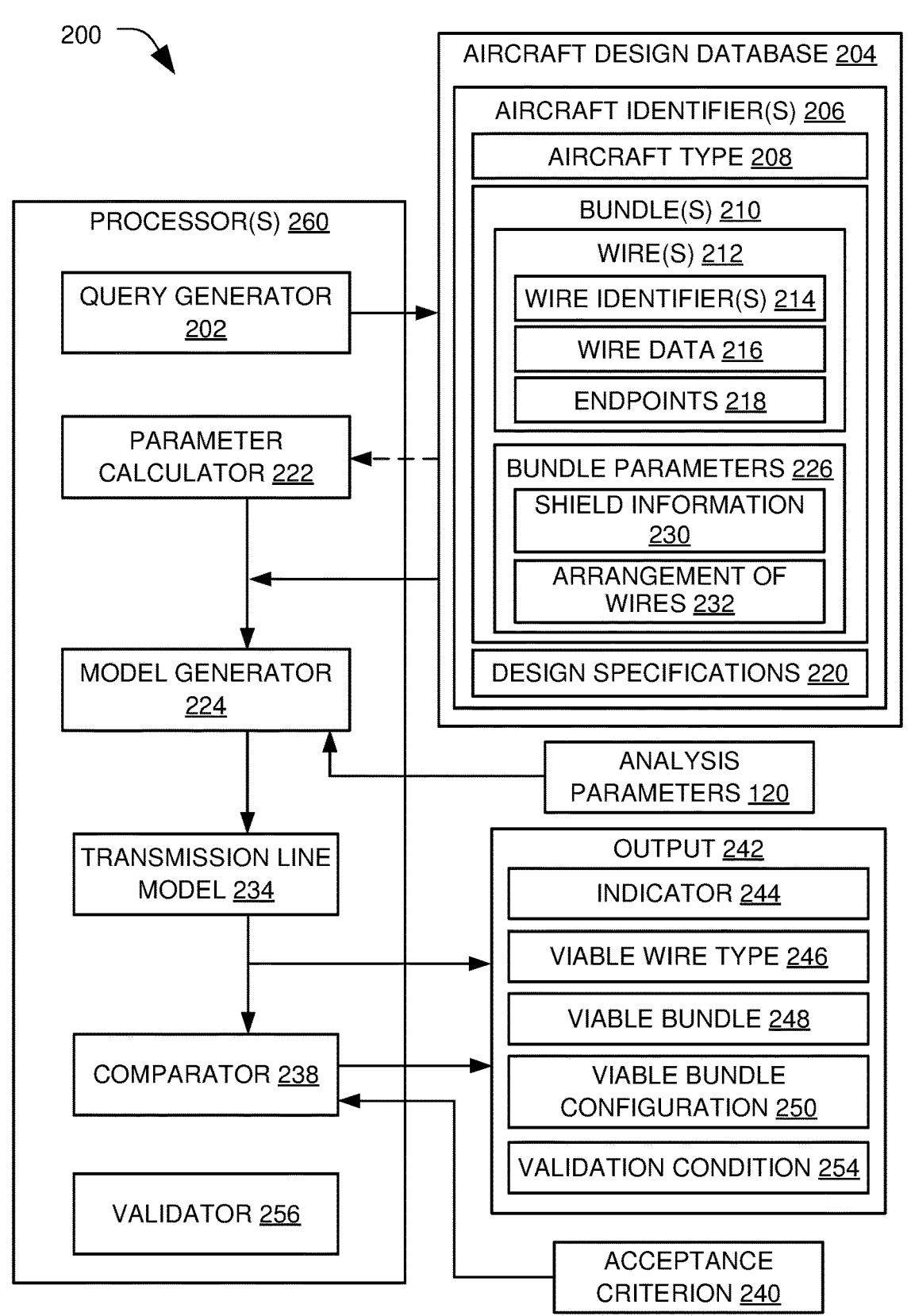
FIG. 2 is a block diagram illustrating an example of a system for routing wires in an aircraft according to a particular aspect.

FIG. 1 is a flow chart that illustrates an example of a method 100 of routing wires in an aircraft. The method 100 of FIG. 1 represents a simplified overview of a wire routing evaluation process. More details of the method 100 are shown in FIG. 2, and details of particular aspects of the method 100 are shown in FIGS. 3, 5, 7, and 8. Various operations of the method 100 of FIG. 1 may be initiated, performed, or controlled by one or more processors executing instructions. To illustrate, the method 100 can be initiated, performed, or controlled by one or more processors executing instructions stored in a system memory.

The method 100 is initiated using one or more wire identifiers 102. For example, a user may input wire identifier(s) 102 of one or more wires that are to be evaluated via the method 100. As another example, the wire identifier(s) 102 may be provided based on a determination that one or more wires are to be re-evaluated, such as due to changes in aircraft design data associated with the one or more wires.

In the example of FIG. 1, the method 100 includes, at block 104, obtaining wire data, candidate bundle data, or both. For example, the wire identifier(s) 102 can be used to generate a search query to an aircraft design database. In this example, the wire identifier(s) 102 can be used to look up wire data, such as connection points of the wire, characteristics of the wire, etc. As non-limiting examples, the characteristics of the wire may indicate a size (e.g., gauge) of the wire, a type of the wire (e.g., solid core, stranded core, twisted pair, coaxial, etc.), electrical or electromagnetic properties of the wire (e.g., resistance per meter), or other properties descriptive of the wire. The connection points of the wire may identify where and/or how the wire is terminated, such as a connector or connector type that terminates the wire, a pin (e.g., a pin number) or pin type that terminates the wire, a panel or LRU to which the wire is connected, or any combination thereof. The candidate bundle data may include descriptors of one or more bundles that extend generally along a path of a wire run of a wire that is to be routed. As non-limiting examples, the descriptors of the candidate bundles may include bundle identifiers (e.g., a name, number, or tag that uniquely identifies each bundle), connectors or endpoints of each candidate bundle, a set of wire identifiers for wires of each candidate bundle, wire data for each wire of each candidate bundle, shield data associated with each candidate bundle, a design specification associated with each candidate bundle, electrical or electromagnetic characteristics of each candidate bundle, or any combination thereof.

As design data, the wire data may be descriptive of wires that are already installed in an aircraft or may be descriptive of wires that are planned for routing in an aircraft that is yet to be built. For example, the method 100 can be used to plan routing of a wire during a process of retrofitting an aircraft that has already been manufactured. In this example, the wire data describes wires that are already present in the aircraft being modified. In another example, the method 100 can be used to plan the design of an aircraft that is yet to be manufactured. In this example, the wire data describes wires that have already been planned for routing in the aircraft. Likewise, the candidate bundle data may be descriptive of bundles that are already installed in an aircraft or may be descriptive of bundles that are planned for routing in an aircraft that is yet to be built.

The method 100 includes, at block 106, determining transmission line parameters for wires in a candidate bundle. For example, a candidate bundle may be selected based one or more endpoints of the bundle. To illustrate, if the bundle extends between two panels, and the wire is to be disposed between the two panels, the bundle may be selected as a candidate bundle for evaluation. Other considerations that may be used to determine whether a bundle is to be selected as a candidate bundle include the number or type of other wires already assigned to the bundle, the location of the bundle within the aircraft, the number or type of connectors associated with the bundle, etc.

The transmission line parameters include electrical and/or electromagnetic characteristics of the wires of the bundle. To illustrate, the transmission line parameters for a bundle with three wires may include the resistance of each of the three wires, the self-inductance of each of the three wires responsive to a particular input signal, the mutual inductance of the wires responsive to the particular input signal, the capacitance of the wires responsive to a particular input signal, other information descriptive of individual electrical or electromagnetic properties or interactions among the wires, etc. In some instances, the aircraft design database includes at least some of the transmission line parameters. In such instances, at least some of the transmission line parameters can be determined by looking up the transmission line parameters in the aircraft design database 204. If all of the transmission line parameters to be used for the evaluation are not present in the aircraft design database, the missing transmission line parameters are determined or estimated based on information that is available in the aircraft design database. To illustrate, if the self-inductance of a particular wire responsive to a particular input signal is not identified in the aircraft design database, the self-inductance can be estimated using physics-based modeling, data descriptive of the physical characteristics of the wire (e.g., the wire gauge, wire type, etc.), and information descriptive of the input signal indicated by analysis parameters 120. The analysis parameters 120, in this example, specify how the evaluation is to be performed, such as a frequency of interest, a location of the wire or bundle to be evaluated, a type of electromagnetic disturbance to be considered, etc.

The method 100 also includes, at block 108, creating a model of the candidate bundle. For example, the transmission line parameters of the candidate bundle and the analysis parameters 120 are used to generate the model. The model is run (e.g., executed or evaluated), at block 112, to estimate the effect of an electromagnetic disturbance on the candidate bundle. To illustrate, the electromagnetic disturbance may include a lightning strike, an electromagnetic pulse, or another electromagnetic disturbance that is external to the aircraft, and running the model, at block 112, may generate results indicating a voltage (e.g., a peak voltage) experienced at a particular location of the bundle (as indicated by the analysis parameters 120), a voltage profile over time experienced at the particular location of the bundle, a current (e.g., a peak current) experienced at the particular location of the bundle, a current profile over time experienced at the particular location of the bundle, or other information. In some implementations, the model may be evaluated (e.g., run) for multiple different electromagnetic disturbances (e.g., multiple different magnitudes, frequencies, frequency profiles, or other characteristics of the electromagnetic disturbance). Additionally, or alternatively, the model may be evaluated (e.g., run) for multiple different candidate bundles or different characteristics of a particular candidate bundle (e.g., for each of several possible arrangements of wires in the bundle).

The results of running the model are evaluated, at block 114, based on an acceptance criterion. For example, the acceptance criterion may include a threshold value of the response to the electromagnetic disturbance. Although block 114 refers to a single acceptance criterion, in some implementations, the results of running the model are compared to multiple acceptance criteria. In a particular implementation, the acceptance criterion is indicated by the analysis parameters 120. In some implementations, the acceptance criterion may be indicated by the aircraft design database. For example, the aircraft design database may include specifications for one or more wires of the bundle. In this example, specification may indicate a range of allowed operational parameters associated with the wire(s), and the acceptance criteria may be determined based on the range of allowed operational parameters. To illustrate, if the specification for a particular wire indicates a maximum current capacity of the wire, the maximum current capacity indicated by the specification can be used as a threshold for determining whether the peak current indicated by the results of running the model is acceptable.

In some implementations, one or more of the operations of the method 100 can be repeated iteratively until a termination condition is met (as indicated in FIG. 1 by a dotted line between the block 114 and the block 104). The termination condition may include a default or user configurable parameter or may be indicated by the analysis parameters 120. In some implementations, multiple termination conditions may be evaluated, and iteration of one or more operations of the method 100 may be stopped if one or more of the termination conditions are met. To illustrate, the termination condition(s) may include a count of iterations, a determination that a bundle satisfies the acceptance criterion, a determination that no candidate bundles remain to be evaluated, or a combination that includes two or more thereof.

As an example, in a particular implementation of the method 100, multiple candidate bundles may be selected at block 104. In this implementation, the operations associated with blocks 106-114 may be performed at least once for each candidate bundle to generate and run multiple models and model results (e.g., one or more sets of results per candidate bundle). In this example, the multiple model results can be output, at block 116, to a user to select a bundle to route a particular wire. In this example, two or more of the multiple models can be generated and evaluated in parallel. Alternatively, the multiple models can be generated and evaluated serially. Parallel generation and execution of the models can be more efficient in terms of utilizing available resources if multiple computing devices or processors are available to perform the operations. However, in some implementations, it may be acceptable to route a wire via any bundle that meets the acceptance criterion. In such implementations, parallelizing model generation and evaluation may be less efficient since multiple bundles that would meet the acceptance criterion may be selected as candidates. In such circumstances, resources may be conserved by generating and evaluating the models sequentially. In other examples, multiple models are generated and evaluated (serially or in parallel) to consider multiple wire types of the wire to be routed, multiple configurations of the bundle, multiple wire routing parameters, or other parameters.

Additionally, or alternatively, a single model can be run multiple times to evaluate different conditions indicated by the analysis parameters 120. For example, a model may be executed repeatedly (in parallel or sequentially) to evaluate different electromagnetic disturbances (e.g., different frequencies of an electrical signal).

After the model output is evaluated, at block 114, results of the model and/or the evaluation may be output, at block 116. For example, the results may include an indicator of whether the model output meets the acceptance criterion. As another example, the results may identify a viable bundle, a viable wire type, a viable bundle configuration, viable wire routing parameters, or other viable parameters. In this context, viable indicates that a parameter is associated with model results that satisfy the acceptance criterion. For example, if models are generated for a first bundle and a second bundle, and model results for the first bundle indicate that the first bundle meets the acceptance criterion, the first bundle is a viable bundle. In this example, the second bundle may also be a viable bundle (if model results associated with the second bundle meet the acceptance criterion) or the second bundle may be a non-viable bundle. Continuing this example, the results output at block 116 may indicate that the first bundle is a viable bundle. In some implementations, the results may also indicate whether the second bundle is a viable bundle.

In the example illustrated in FIG. 1, the method 100 also includes validating the results, at block 118. For example, the results may be validated based on or responsive to changes to the aircraft design database. To illustrate, if the aircraft design database is updated to indicate a change to a particular panel that the modeled bundle connects to, one or more operations of the method 100 may be repeated to determine whether the change causes a viable bundle to fail the acceptance criterion, whether the change causes a non-viable bundle to meet the acceptance criterion, or both. As another example, the results may be validated periodically (e.g., daily, weekly, monthly, or according to some other period) or occasionally (e.g., before or after particular milestone events).

In some implementations, the operations of the method 100 are initiated, performed, or controlled by one or more hardware devices, such as an application-specific integrated circuit (ASIC) or a field-programmable gate array (FPGA). In some implementations, the operations of the method 100 are initiated, performed, or controlled by a processor executing computer-readable instructions.

The method 100 improves the reliability of wire routing within an aircraft by testing or modeling wire routing decision based on a primary, authoritative data source, such as the aircraft design database. Additionally, the wire routing decisions can be tied to the design data used in the analysis to make the decisions so that the decisions can be checked later and/or updated automatically if the underlying data is changed. Further, the method 100 enables a data driven approach to wire routing such that gaps in the data and/or content of the data determines how particular routing decisions are determined. As a result, a more efficient (in terms of computing resource utilization) set of operations can be used if complete data if available, whereas a less efficient set of operations can be used if particular data is missing. Further, the method 100 is scalable based on available computing resources. For example, if multiple processors or cores are available to perform various operations in parallel, portions of the method 100 can be executed in parallel to evaluate multiple distinct candidate wire bundles, multiple sets of analysis parameters, or both.

FIG. 2 is a block diagram illustrating an example of a system 200 for routing wires in an aircraft according to a particular aspect. In the system 200, one or more processors 260 are configured to access an aircraft design database 204 to generate output 242 associated with wire routing in the aircraft. In the example illustrated in FIG. 2, the processor(s) 260 are configured to execute instructions to perform various operations associated with wire routing. For ease of description, the instructions are illustrated in FIG. 2 as including or corresponding to several functional blocks, such as a query generator 202, a parameter calculator 222, a model generator 224, a transmission line model 234, a comparator 238, and a validator 256. This particular grouping of functional blocks is merely for convenience and should not be considered limiting. In other examples, the instructions include more, fewer, or different functional groupings or no distinct and separate functional groupings.

The query generator 202 is configured to receive input from a user or from another module of the system 200 to initiate a wire routing analysis or to start a search process for information that can be used by subsequent wire routing processes. For example, a user may provide input via a webpage or via a user interface of a local application (e.g., a wire routing application or an aircraft design application). The input is used to generate a search query to search an aircraft design database 204. For example, the query generator 202 may generate a structured query language (SQL) query or a database query using another query language or format. The query is used to access data from the aircraft design database 204. The specific content of the search query depends on the structure of the aircraft design database 204 and the data stored therein. As one example, to evaluate wire routing for an aircraft, the query may include one or more aircraft identifiers 206 and one or more wire identifiers 214. The aircraft identifier(s) 206 may identify individual aircraft (as in the case of a tail number) or may distinguish two or more aircraft types 208 (as in the case of a model number or build number). The wire identifier(s) 214 include, as illustrative non-limiting examples: a number, name, or tag assigned to an individual wire (of one or more wires 212); a number, name, or tag assigned to a particular bundle (or one or more bundles 210) and a designator of a particular wire of the bundle (such as a pin number); a number, name, or tag assigned to one or more endpoints 218 of the wire; etc. In this context, an endpoint of a wire includes a connector or terminal of the wire, or a component to which the wire attaches during use (e.g., a panel, an LRU, etc.). In some implementations, when the wire identifier(s) 214 identify one or more endpoints 218, the wire identifier(s) 214 may also designate a particular wire of the connector, panel, or LRU (such as a pin number).

The query can return wire data 216 of the wire(s) 212 associated with the aircraft identifier(s) 206 and the wire identifier(s) 214. The wire data 216 include, as illustrative non-limiting examples, descriptions of the type of wire, descriptions of the endpoints 218 of the wire 212, descriptions of the position of the wire with reference to a bundle 210 that includes the wire or a connector of the bundle (such as a bundle cross-section indicating positions of several wires of the bundle), etc. In some implementations, the wire data 216 may also, or alternatively, include information about the electrical or electromagnetic characteristics of the wire, design specifications 220 associated with the wire, etc. In this context, the electrical or electromagnetic characteristics of the wire include, for example, resistance of the wire, an impedance of the wire responsive to a particular signal, a self-inductance of the wire responsive to a particular signal, or other electrical or electromagnetic properties of the wire. The type of wire may indicate, for example, a gauge of the wire, a material of the wire, an insulating material of the wire, whether the wire is shielded, a core type of the wire (e.g., solid core or stranded core), other physical characteristics of the wire (e.g., whether the wire is part of a twisted pair or coaxial cable), or a combination thereof. In some implementations, the design specifications 220 indicate any of the wire data 216 and may also, or alternatively, indicate design limits associated with the wire, such as a maximum current or a maximum voltage that the wire is designed to accommodate, an operating temperature range, etc.

The query can also, or alternatively, return bundle parameters 226 for one or more candidate bundles 210. For example, the bundle parameters 226 may include shield information 230 indicating whether a particular bundle 210 includes one or more shields, a type of shield associated with the bundle 210, electrical or electromagnetic characteristics of a shield of the bundle 210, or any combination thereof. As another example, the bundle parameters 226 may indicate an arrangement of wires 232 (e.g., a bundle cross section) of a particular bundle 210. In some examples, the bundle parameters 226 of a particular bundle 210 include or are linked to the wire data 216 for the wires 212 of the particular bundle 210.

In the example illustrated in FIG. 2, at least some of the information retrieved from the aircraft design database 204 (e.g., the wire data 216) is provided as input to a model generator 224. In some implementations, at least a portion of the information retrieved from the aircraft design database 204 is used by a parameter calculator 222 to determine additional information based on the information retrieved from the aircraft design database 204. For example, in some circumstances, the wire data 216 may not include information that the model generator 224 needs to generate the transmission line model 234. In such circumstances, the parameter calculator 222 may determine or estimate values of missing parameters.

As one example, in a particular implementation, the parameter calculator 222 is configured to determine or estimate an arrangement of wires 232 of the bundle (e.g., a bundle cross-section) if the wire data 216 does not indicate a particular arrangement of the wires in the bundle. For example, the parameter calculator 222 may determine the arrangement of wires 232 on the assumption that the bundle is a tightly packed bundle.

As another example, the wire data 216 may be incomplete for a portion of a wire run. In this example, the parameter calculator 222 may use wire tracing techniques to further query the aircraft design database 204 to attempt to fill in the missing data.

As yet another example, the parameter calculator 222 may calculate inductance, capacitance, and/or resistance information for the bundle, for individual wires of the bundle, or both. To illustrate, the analysis parameters 120 may indicate, among other things, one or more frequencies of interest or a frequency range of interest, and the parameter calculator 222 may determine, for the frequenc(ies) of interest, a self-inductance of each wire of the bundle, mutual inductance among wires of the bundle, capacitance of the wires of the bundle, resistance of the wires of the bundle, or any combination thereof. To illustrate, if the bundle is a simple bundle (e.g., includes no more than one shield and the wires of the bundle are similar to one another (e.g., the same size, the same type, or both)), the parameter calculator 222 may estimate the inductance and capacitance parameters using approximate analytic equations for simple geometries (such as those described in Paul, Clayton R. 2008. *Analysis Of Multiconductor Transmission Lines*. New Jersey: John Wiley.). If the bundle is not a simple bundle (e.g., includes more than one shield, the wires of the bundle are not similar to one another, or both), the parameter calculator 222 may generate a two-dimensional (2D) finite element model of the bundle cross-section and use the 2D finite element model to solve for the inductance and capacitance parameters.

In still another example, the parameter calculator 222 may determine a transfer impedance of the bundle if shield information 230 indicated that the bundle is shielded. For example, if the shield information 230 indicates that the bundle includes a braided shield, the transfer impedance of the bundle can be calculated using a qualitative approach, such as the approximate formulas for the coupling parameters of cables with single-braided shields described by Kley in "Optimized single-braided cable shields," IEEE Transactions on Electromagnetic Compatibility, vol. 35, 1-9 (1993). As another example, if the shield information 230 indicates that the bundle includes a solid shield, the transfer impedance of the bundle can be calculated using a solid shield equation, such as described by Vance in "Shielding effectiveness of braided wire shields," Interaction Note 172, (1974).

The model generator 224 generates the transmission line model 234 based on bundle transmission parameters and the analysis parameters 120. The bundle transmission parameters include information retrieved from the aircraft design database 204 and may also include additional information generated by the parameter calculator 222. The transmission line model 234 is configured to, upon evaluation or execution, generate a model result indicating an estimated effect of an electromagnetic disturbance on the wire bundle. For example, the estimated effect may include or correspond to a voltage profile over time, a peak voltage, a current profile over time, a peak current, a value (or values) of one or more other electrical or electromagnetic parameters, a frequency response, or any combination thereof.

In some implementations, the model result is also provided to the comparator 238. The comparator 238 is configured to perform a comparison of the estimated effect of the electromagnetic disturbance on each wire bundle to an acceptance criterion 240. In such implementations, at least a portion of the output 242 is based on a result of the comparison. For example, the output 242 may include an indicator 244 that indicates whether a particular routing of one or more wires satisfies a design specification. In this example, the acceptance criterion 240 may include or correspond to a threshold, such as maximum current or a maximum voltage, indicated by the design specifications 220, and the indicator 244 indicates whether the model result indicates that a modeled wire routing (corresponding to a particular set of bundle transmission parameters) results in a value (e.g., a peak current or peak voltage) that exceeds the threshold.

In some implementations, multiple candidate bundles may be modeled or multiple configurations of a candidate bundle may be modeled. In either case, the output 242 may include multiple model results or results of comparison of the multiple model results to the acceptance criterion 240. To illustrate, each of the model results can be compared to the acceptance criterion 240, and the output 242 can indicate which, if any, of the modeled bundles or configurations meet the acceptance criterion 240. As an example, a particular candidate bundle can be modeled to route a wire as either a solid core wire or a stranded core wire (or some other wire type difference), and the output 242 may indicate which, if any, wire type is a viable wire type 246. In this context, a viable wire type 246 is a wire type associated with model results that meet the acceptance criterion 240. As an example, multiple candidate bundles can be modeled to route a wire, and the output 242 may indicate which, if any, of the candidate bundles is a viable bundle 248. In this context, a viable bundle 248 is a candidate bundle associated with model results that meet the acceptance criterion 240. As yet another example, multiple configurations of a candidate bundle can be modeled to route a wire, and the output 242 may indicate which, if any, of the bundle configurations is a viable bundle configuration 250. In this context, a viable bundle configuration 250 is a bundle configuration associated with model results that meet the acceptance criterion 240.

In some implementations, the output 242 further indicates a validation condition 254. In such implementations, the validation condition 254 indicates when the output 242 should be confirmed, and the output 242 is considered valid only if (or while) the validation condition 254 is satisfied. In a particular aspect, the validation condition 254 is time-based, in which case, the validation condition 254 is satisfied for a particular duration after generation of the output 242. In another particular aspect, the validation condition 254 is satisfied until particular data of the aircraft design database 204 is modified. The validator 256 may cause the system 200 to recheck the output 242 when the validation condition 254 is determined to not be satisfied. For example, the validator 256 causes the query generator 202 to generate a query to determine whether the aircraft design database 204 includes updated data. In another example, the validator 256 causes the parameter calculator 222 to calculate updated parameter values. In still another example, the validator 256 causes the model generator 224 to generate an updated transmission line model 234. In yet another example, the validator 256 causes the comparator 238 to compare model results to the acceptance criterion 240.

The system 200 enables generating improved wire routing decisions by testing or modeling a wire routing decision based on a primary, authoritative data source, such as the aircraft design database 204. Additionally, the system 200 ties the wire routing decisions to the data used to make the decisions so that the system 200 can check and/or update the decisions later if the underlying data is changed. Further, the system 200 is flexible in that different operations can be performed depending on the available data. For example, one or more operations of the parameter calculator 222 may be omitted (resulting in a more efficient use of computing resources) if particular data is available in the aircraft design database 204.

FIG. 3 is a flow chart that illustrates an example 300 of particular aspects of the method 100 of routing wires in an aircraft of FIG. 1. In particular, the example 300 illustrates operations that may be performed at the block 104 to obtain wire data. Various operations of the example 300 of FIG. 3 may be initiated, performed, or controlled by one or more processors executing instructions. To illustrate, the operations may be initiated, performed, or controlled by the processor(s) 260 executing instructions from a memory.

In FIG. 3, an aircraft identifier 206 and identifiers of one or more wire runs (e.g., wire run identifier(s) 302 in FIG. 3) are used to trace one or more wires, at block 312. For example, the aircraft identifier 206 may designate a particular aircraft (e.g., by tail number) or a particular model of aircraft (e.g., a Boeing® (a registered trademark of The Boeing Company, Washington) 777-9). The wire run identifier(s) 302 include data identifying a wire run, which may include one or more wires routed via one or more bundles.

In some implementations, a wire run extends from a first LRU to a second LRU via more than one wire. To illustrate, FIG. 4 is a diagram of an example of a user interface display 400 showing wire information. In FIG. 4, the user interface display 400 includes a wire selector input 404 to enable a user to input wire run identifier(s) 302. In the specific example of FIG. 4, the wire selector input 404 includes a first input selector 430 to receive a first connector identifier 304 (illustrated as W2142 in FIG. 4), a second input selector 432 to receive a first pin identifier 306 (illustrated as A01 in FIG. 4), a third input selector 434 to receive a second connector identifier 308 (illustrated as W332A in FIG. 4), and a fourth input selector 436 to receive a second pin identifier 310 (illustrated as D03 in FIG. 4).

Additionally, in the example illustrated in FIG. 4, the user interface display 400 includes a wire diagram display 402 illustrating the wire run(s) described by input provided via the wire selector input 404. In this specific example, the wire diagram display 402 illustrates a first connector 410 (e.g., connector W2142) that includes a pin A01 that terminates a wire 420, a second connector 412 (e.g., a first side of panel or bulkhead connector, labeled W3114 in FIG. 4) that includes a pin B01, a third connector 414 (e.g., a second side of the panel or bulkhead W3114) that includes a pin C01, and a fourth connector 416 (e.g., connector W332A) that includes a pin D03 that terminates a wire 422. Thus, a wire run between connector W2142 pin A01 and connector W332A pin D03 includes wires 420 and 422.

In the example of FIG. 4, the wire 420 is part of a bundle 424, and the wire 422 is part of a bundle 426. Additionally, in this example, the bundle 424 includes a wire 428 that splits off of the bundle 426 to connect to a different connector (e.g., connector 440).

FIG. 4 illustrates that a wire run may be identified by two endpoints. Returning to FIG. 3, a first endpoint of a wire run is specified by a first connector identifier 304 and a first pin identifier 306, and a second endpoint of the wire run is specified by a second connector identifier 308 and a second pin identifier 310. The first connector identifier 304 includes a name, number, or tag associated with a connector that includes a wire of the wire run. To illustrate, in the example of FIG. 4, the first connector identifier 304 is "W2142" which is a name associated with the connector 410 that includes a termination of the wire 420. Further, the first pin identifier 306 includes a name, number, or tag associated with a pin or other terminator of the wire within the connector. To illustrate, in the example of FIG. 4, the first pin identifier 306 is "A01" which designates a pin of the connector "W2142" that terminates the wire 420. Continuing this example, the second connector identifier 308 includes a name, number, or tag associated with a second connector that includes a wire of the wire run. To illustrate, in the example of FIG. 4, the second connector identifier 308 is "W332A" which is a name associated with the connector

416 that includes a termination of the wire 422. Further, the second pin identifier 310 includes a name, number, or tag associated with a pin or other terminator of the wire within the connector. To illustrate, in the example of FIG. 4, the second pin identifier 310 is "D01" which designates a pin of the connector "W332A" that terminates the wire 422.

The wire tracing operations of the block 312 generate a list of wire identifiers 316 by querying the aircraft design database 204. For example, in some implementations, the list of wire identifiers 316 includes a bundle identifier and a wire identifier for each wire along the wire run. To illustrate, in the example of FIG. 4, the list of wire identifiers 316 would include a bundle identifier of the bundle 424 and a wire identifier of the wire 420 and would include a bundle identifier of the bundle 426 and a wire identifier of the wire 422.

FIG. 5 is a flow chart that illustrates an example 500 of particular aspects of the method 100 of routing wires in an aircraft of FIG. 1. In particular, the example 500 illustrates operations that may be performed at the block 104 to obtain candidate bundle data. Various operations of the example 500 of FIG. 5 may be initiated, performed, or controlled by one or more processors executing instructions. To illustrate, the operations may be initiated, performed, or controlled by the processor(s) 260 executing instructions from a memory.

The example 500 of FIG. 5 includes, at block 502, accessing wiring data for a particular aircraft type. For example, the query generator 202 of FIG. 2 may generate a search query to search the aircraft design database 204 to access wire data (e.g., the wire data 216) for a particular aircraft type 208. In this example, the search query may include or be based on the list of wire identifiers 316 of FIG. 3.

The example 500 of FIG. 5 also includes, at block 504, searching for bundle data based on the list of wire identifiers 316 of FIG. 3. In a particular implementation, the bundle data includes, for example, a list of wires of the bundle, specifications associated with the wires of the bundle, information describing the core material of each wire, information describing insulation material of each wire, information describing shielding of the bundle, information describing an arrangement of wires in the bundle (e.g., a bundle cross section), other information descriptive of the bundle, connectors of the bundle, or wires of the bundle, or any combination thereof. In a particular aspect, the query generator 202 uses the wire data 216 of FIG. 2 or the list of wire identifiers 316 of FIG. 3 to access the aircraft design database 204 to determine the bundle data. To illustrate, query generator 202 may generate a query that includes a bundle identifier or a wire identifier 214, and the query may return the bundle parameters 226, a list of wires (e.g., the wire(s) 212) associated with the bundle, design specifications 220 associated with the wires, or a combination thereof.

The example 500 of FIG. 5 also includes, at block 506, determining whether the bundle data was found at the block 504 (or whether the bundle data is complete). If the bundle data is found (and is complete) the bundle data 508 is output. If the bundle data is not found (or is incomplete) the example 500 of FIG. 5 includes further operations to piece the bundle data together and/or to generate or estimate portions of the bundle data. In the example 500 of FIG. 5, the operations to piece the bundle data together include searching the aircraft design database 204 using targeted search queries and/or estimating certain data. To illustrate, the operations include, at block 510, obtaining a wire specification. In this illustrative example, the query generator 202 may generate a query to retrieve a specific design specification 220 associated with a particular wire 212 of the bundle. The operations may also include, at block 512, determining a core material of the wire, and, at block 514, determining insulation material of the wire. To illustrate, the core material and the insulation material of the wire may be extracted from the wire specification. The operations may also include, at block 516, determining shield data (e.g., the shield information 230) of the bundle. For example, the shield data of the bundle may be determined based on a bundle specification of the design specifications 220 associated with the bundle.

In FIG. 5, the operations to piece the bundle data together include, at block 518, determining whether a bundle cross-section is available and, at block 520, determining an arrangement of conductors in the bundle. In a particular aspect, if the bundle specification includes a bundle cross-section, the arrangement of conductors in the bundle is determined, at block 522, using the bundle specification. If the bundle cross-section is not available, the arrangement of conductors in the bundle is determined, at block 524, based on default parameters. To illustrate, the arrangement of conductors in the bundle may be approximated on the assumption that the bundle is a tightly packed bundle of wires. In the example 500 of FIG. 5, the arrangement of conductors in the bundle, the shield data, and wire specific information (e.g., wire insulating material, wire core material, or other information from the wire specification) is added to other data obtained by searching for bundle data (e.g., at block 504) to generate the bundle data 508.

FIG. 6 is a diagram that illustrates an example of a user interface display 600 showing bundle data, such as the bundle data 508, for a particular bundle. In the example illustrated in FIG. 6, the bundle data 508 includes a bundle cross-section 604, information descriptive of one or more bundle connectors (e.g., a first bundle connector 602 and a second bundle connector 610). Although FIG. 6 illustrates the bundle as having two ends, each associated with a respective connector 602, 610, in other examples, the bundle may have more than two ends. To illustrate, in the example illustrated in FIG. 4, the bundle 424 has three ends and three connectors.

In the example of FIG. 6, the bundle cross-section 604 illustrates an arrangement of conductors (e.g., wires) in the bundle and may include data identifying one or more of the wires, such as a wire 608. The bundle cross-section 604 of FIG. 6 also illustrates a shield 606 of the bundle. The bundle cross-section 604 may be retrieved from the aircraft design database 204 or may be estimated based on default parameters, as described with reference to FIG. 5.

The user interface display 600 of FIG. 6 also includes information 612 descriptive of the bundle, such as an aircraft type identifier, a bundle identifier, and an indication of whether the bundle is shielded. The user interface display 600 also includes a section 614 that includes wire data for wires of the bundle. For example, in FIG. 6 the wire data includes a wire identifier, a wire gauge, and a wire type, for each wire of the bundle.

In other examples, the user interface display 600, the bundle data 508, or both, include more data elements, fewer data elements, or different data elements than illustrated in FIG. 6. For example, the wire data for each wire may also, or alternatively, indicate a wire insulation material of each wire. As another example, the user interface display 600, the bundle data 508, or both, may omit identifiers of the connectors of the bundle.

FIG. 7 is a flow chart that illustrates an example 700 of particular aspects of the method 100 of routing wires in an aircraft of FIG. 1. In particular, the example 700 illustrates operations that may be performed at the block 106 to determine transmission line parameters for wires of a candidate bundle. Various operations of the example 700 of FIG. 7 may be initiated, performed, or controlled by one or more processors executing instructions. To illustrate, the operations may be initiated, performed, or controlled by the processor(s) 260 executing instructions from a memory.

The example 700 of FIG. 7 includes, at block 702, determining, based on the bundle data 508, whether the candidate bundle is a simple bundle. In this context, a simple bundle is a bundle that is unshielded or includes one shield. Additionally, or alternatively, a simple bundle is a bundle in which all of the wires are similar to one another (e.g., the wires have the same gauge, are of the same wire type, or both). A method to determine, at block 704, inductance and capacitance properties of the candidate bundle is selected based on whether the candidate bundle is a simple bundle or not.

If the candidate bundle is a simple bundle, the inductance and capacitance properties are determined, at block 710, using approximate analytical equations based on the bundle data 508, a height above ground plane 706 of the candidate bundle, and one or more frequencies of interest 708. If the candidate bundle is not a simple bundle, the inductance and capacitance properties are determined, at block 712, using a 2D model (e.g., a finite element model) based on the bundle data 508, the height above ground plane 706 of the candidate bundle, and the one or more frequencies of interest 708.

In a particular implementation, the inductance and capacitance properties include, for each frequency of interest 708: a self-inductance of each wire of the candidate bundle, mutual inductance of each pair of wires of the candidate bundle, and capacitance of the wires. For example, FIG. 9 shows a diagram that illustrates an example of a user interface display 900 that indicates inductance properties (e.g., cable inductance 902) and capacitance properties (e.g., cable capacitance 904) of a candidate bundle. In the user interface display 900 of FIG. 9, the cable inductance 902 properties indicate a self-inductance of each wire of a candidate bundle that includes four wires. Additionally, the cable inductance 902 properties indicate a mutual-inductance of each wire on each other wire of the candidate bundle. Additionally, in the user interface display 900 of FIG. 9, the cable capacitance 904 properties indicate a conductor to reference capacitance for each of the wires of the candidate bundle, and a capacitance between each pair of wires of the candidate bundle.

Returning to FIG. 7, at block 714, the resistance of each wire is determined (if it is not already indicated in the bundle data 508). To illustrate, the resistance of a particular wire may be determined based on the conductivity of the wire and the radius of the wire.

At block 716, a determination is made whether the candidate bundle is a shielded bundle. If the candidate bundle is not shielded, the transmission line parameters 720 of the candidate bundle are output and include the inductance, capacitance, and resistance determined for the wires of the bundle. If the candidate bundle is a shielded bundle, the transmission line parameters 720 also include a transfer impedance of the bundle, which is determined at block 718. In some implementations, operations used to determine the transfer impedance of the bundle depend on the type of shield of the bundle. To illustrate, if the shield is braided, the transfer impedance of the bundle may be calculated using a qualitative approach, such as the approximate formulas for the coupling parameters of cables with single-braided shields described by Kley in "Optimized single-braided cable shields," IEEE Transactions on Electromagnetic Compatibility, vol. 35, 1-9 (1993). Alternatively, if the shield is solid, the transfer impedance of the bundle can be calculated using a solid shield equation, such as described by Vance in "Shielding effectiveness of braided wire shields," Interaction Note 172, (1974).

FIG. 8 is a flow chart that illustrates an example 800 of particular aspects of the method 100 of routing wires in an aircraft of FIG. 1. In particular, the example 800 illustrates operations that may be performed at the blocks 108 and 112 to create and run a model of the candidate bundle. Various operations of the example 800 of FIG. 8 may be initiated, performed, or controlled by one or more processors executing instructions. To illustrate, the operations may be initiated, performed, or controlled by the processor(s) 260 executing instructions from a memory.

The example 800 includes, at block 804, generating one or more test points. For example, the test point(s) may specify one or more wire, connectors, pins, or other locations of a candidate bundle or of a wire of the candidate bundle that are to be evaluated by the model. To illustrate, the model may be generated to evaluate a voltage or current at a particular pin that results from an electromagnetic disturbance. The test point(s) may be generated based on the bundle data 508, the transmission line parameters 720, analysis locations 802 identified in the analysis parameters 120 of FIG. 1, or a combination thereof. For example, the analysis location(s) 802 may be specified by a user, may be preconfigured in a particular test set up, or may be selected by the processor(s) 260 of FIG. 2 based on user input, default values, or the test set up. As another example, each pin of each wire of the candidate bundle identified in the bundle data 508 may be identified as a test point.

The example 800 also includes, at block 808, modeling threat input based on the bundle data 508, the transmission line parameters 720, external source data 806 identified in the analysis parameters 120 of FIG. 1, or a combination thereof. For example, the external source data 806 may indicate a type and/or other characteristics of the electromagnetic disturbance that is to be modeled. In a particular aspect, the electromagnetic disturbance includes or corresponds to a current source. In another particular aspect, the electromagnetic disturbance includes or corresponds to electromagnetic waveform. To illustrate, the electromagnetic disturbance may simulate one or more phases of a lightning strike or another external signal.

In FIG. 8, the test points and the threat input are used, at block 810, to generate a model (e.g., the transmission line model 234) of the candidate bundle, and at block 812, the model is run (e.g., evaluated) to generate at least a portion of the output 242. For example, the output 242 generated by the model may include or correspond to a voltage (e.g., a peak voltage) experienced at a particular test point, a voltage profile over time experienced at the particular test point, a current (e.g., a peak current) experienced at the particular test point, a current profile over time experienced at the particular test point, a frequency response at the particular test point, or other information. FIG. 10 is a diagram that illustrates an example of a user interface display 1000 showing output generated by running a transmission line model. In FIG. 10, the output includes a frequency response profile 1002 at a particular test point. FIG. 10 also illustrates a threshold 1004 representing an acceptance criterion (e.g., the acceptance criterion 240 of FIG. 2). In the example illustrated in FIG. 10, the bundle satisfies the acceptance criterion as long as no point of the frequency response profile 1002 exceeds the threshold 1004.

Referring to FIG. 11, a method 1100 of routing wires in an aircraft is shown. In a particular aspect, one or more operations of the method 1100 are performed by the processor(s) 260 executing instructions from a memory. For example, one or more of the operations of the method 1100 may be performed by the query generator 202, the parameter calculator 222, the model generator 224, the transmission line model 234, the comparator 238, the validator 256 of FIG. 2, or a combination thereof.

The method 1100 includes, at block 1102, receiving input including one or more wire identifiers and an aircraft identifier indicating an aircraft type of the aircraft. For example, the query generator 202 may receive user input or preconfigured test data indicating the wire identifier(s) 214, the aircraft type 208, or both.

The method 1100 includes, at block 1104, obtaining data specifying one or more wires to be routed in an aircraft. For example, the query generator 202 may receive user input or other data specifying one or more wires to be routed in an aircraft.

The method 1100 includes, at block 1106, obtaining input indicating a threat to be evaluated. An electromagnetic disturbance to be modeled is based on the threat to be evaluated. For example, the threat to be evaluated may simulate a lightning strike or an interfering signal. The input indicating the threat to be evaluated may be received via user input or from preconfigured test data (e.g., the analysis parameters 120) that define particular test criterion for wires that are to be routed in the aircraft.

The method 1100 includes, at block 1108, selecting, from aircraft design data retrieved from an aircraft design database, one or more wire bundles that are candidates for routing the one or more wires. For example, the query generator 202 of FIG. 2 may generate one or more queries to the aircraft design database 204 to retrieve data descriptive of the one or more candidate wire bundles. In some implementations, selecting one or more wire bundles as candidates for routing the wire(s) includes identifying one or more additional wires that are planned for routing along at least a portion of a path between end points of the one or more wires. For example, as described with reference to FIG. 4, a candidate bundle may include multiple wires, and the query generator 202 of FIG. 2 may retrieve wire data 216 for each of the wires of the candidate bundle.

The method 1100 includes, at block 1110, determining transmission line parameters for each wire of each of the one or more wire bundles. For example, if the aircraft design database 204 includes the transmission line parameters for each wire of each of the one or more wire bundles, the query generator 202 of FIG. 2 determines the transmission line parameters by querying the aircraft design database 204. Alternatively, if the aircraft design database 204 does not include a complete set of transmission line parameters for each wire, the parameter calculator 222 of FIG. 2 determines the missing transmission line parameters based on available wire data 216, design specifications 220 associated with the wire(s), or both. The transmission line parameters for a particular wire include, for example and without limitation, capacitance values, inductance values, and resistance values for each of one or more frequencies of interest. In a particular example, the transmission line parameters include or correspond to the transmission line parameters 720. In this example, the transmission line parameters 720 may be determined using one or more of the operations described with reference to FIG. 7.

The method 1100 includes, at block 1112, determining bundle parameters for each of the one or more wire bundles. For example, if the aircraft design database 204 includes the bundle parameters for each of the wire bundle(s), the query generator 202 of FIG. 2 determines the bundle parameters by querying the aircraft design database 204. Alternatively, if the aircraft design database 204 does not include a complete set of bundle parameters for each wire bundle, the parameter calculator 222 of FIG. 2 determines (e.g., estimates) the missing bundle parameters based on available bundle parameters 226, design specifications 220 associated with the bundle(s), or both. In a particular aspect, the bundle parameters for a particular wire bundle include wire data for each wire of the particular wire bundle and shield information for the particular wire bundle. In a particular example, the bundle parameters include or correspond to the transmission line parameters 720. In this example, the transmission line parameters 720 may be determined using one or more of the operations described with reference to FIG. 7.

The method 1100 includes, at block 1114, for each wire bundle of the one or more wire bundles, generating a transmission line model to determine an estimated effect of an electromagnetic disturbance on the wire bundle. For example, the model generator 224 of FIG. 2 generates the transmission line model 234 based on the bundle transmission parameters, the analysis parameters 120, and possibly other data. To illustrate, the model generator 224 may perform one or more of the operations described with reference to FIG. 8 to generate the transmission line model 234.

The method 1100 includes, at block 1116, performing a comparison of the estimated effect of the electromagnetic disturbance on each wire bundle to an acceptance criterion. For example, the comparator 238 of FIG. 2 may compare an estimated effect of the electromagnetic disturbance output as a result of evaluating the transmission line model 234 to the acceptance criterion 240. In a particular aspect, the estimated effect of the electromagnetic disturbance includes a voltage profile over time and the acceptance criterion includes a maximum voltage. Additionally, or alternatively, the estimated effect of the electromagnetic disturbance includes a current profile over time and the acceptance criterion includes a maximum current. Additionally, or alternatively, the estimated effect of the electromagnetic disturbance includes a frequency response profile and the acceptance criterion includes a maximum magnitude of the frequency response.

The method 1100 includes, at block 1118, generating output indicating whether, based on the comparison, a particular routing of the one or more wires satisfies a design specification. For example, the comparator 238 of FIG. 2 generates at least a portion of the output 242 that includes the indicator 244, and the indicator 244 indicates whether the particular routing of the wire(s) satisfies a design specification. To illustrate, the acceptance criterion 240 may be indicated by the design specification, and wire routing that meets the acceptance criterion 240 is considered to satisfy the design specification.

In some implementations, the method 1100 includes generating other output in addition to or instead of the indication of whether the particular routing of the one or more wires satisfies the design specification. For example, the output may indicate a viable wire type of each of the one or more wires, a viable bundle of the one or more wire bundles, a viable bundle configuration, or a combination thereof.

In some implementations, the method 1100 includes determining a validation condition that indicates when the output should be re-evaluated. The validation condition indicates when or under what circumstances the output is valid or invalid. For example, the validation condition may be time based, in which case the output is considered valid for a particular amount of time. As another example, the validation condition may be event based, in which case the output is considered valid until or unless a particular event occurs. To illustrate, the event may include updating particular data of the aircraft design database 204, and the output may be considered invalid if the particular data is updated. In the example illustrated in FIG. 11, the method 1100 includes, at block 1120, periodically or occasionally querying the aircraft design database to determine whether the validation condition is satisfied. For example, the validator 256 may periodically or occasionally cause the query generator 202 to query the aircraft design database 204 to determine whether the validation condition is satisfied. If the validation condition is not satisfied, the operations of the method 1100 may be repeated to validate (or recreate) the output.

The method 1100 improves the reliability of wire routing within an aircraft by testing or modeling wire routing decisions based on a primary, authoritative data source, such as the aircraft design database. Additionally, the wire routing decisions can be tied to the data used to make them so that the decisions can be checked later and/or updated automatically if the underlying data is changed. Further, the method 1100 enables a data driven approach to wire routing such that gaps in the data and/or content of the data determines how particular routing decisions are determined. As a result, a more efficient (in terms of computing resources required) set of operations can be used if complete data if available, whereas a less efficient set of operations can be used if particular data is missing. Further, the method 1100 is scalable based on the available computing resources. For example, if multiple processors or cores are available to perform various operations in parallel, portions of the method 1100 can be executed in parallel to evaluate multiple distinct candidate wire bundles, multiple sets of analysis parameters, or both.

Referring to FIG. 12, a flowchart illustrative of a life cycle 1200 of an aircraft (such as an aircraft 1300 of FIG. 13) is shown. During pre-production, the life cycle 1200 includes, at block 1202, specification and design of an aircraft, such as the aircraft 1300 of FIG. 13. During specification and design of the aircraft 1300, the life cycle 1200 may include specification and design of one or more bundles 1220 each including one or more wires 1222 that are routed using the method of FIG. 1. At block 1204, the life cycle 1200 includes material procurement, which may include procuring materials for the wire(s) 1222 and bundles 1220.

During production, the life cycle 1200 includes, at block 1206, component and subassembly manufacturing and, at block 1208, system integration of the aircraft 1300. For example, the life cycle 1200 may include component and subassembly manufacturing, such as assembling the wire(s) 1222 to form the bundle(s) 1220 and/or routing the bundle(s) 1220 within the aircraft 1300. At block 1210, the life cycle 1200 includes certification and delivery of the aircraft 1300 and, at block 1212, placing the aircraft 1300 in service. Certification and delivery may include certification of the wire(s) 1222 and/or bundle(s) 1220 to place the aircraft 1300 in service. While in service by a customer, the aircraft 1300 may be scheduled for routine maintenance and service (which may also include modification, reconfiguration, refurbishment, and so on). At block 1214, the life cycle 1200 includes performing maintenance and service on the aircraft

1300, which may include performing maintenance and service on the bundle(s) 1220 and/or the wire(s) 1222 or may include routing new bundle(s) 1220 or wire(s) 1222 according to the method of FIG. 1.

Each of the processes of the life cycle 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

In the example of FIG. 13, the aircraft 1300 includes an airframe 1318 with a plurality of systems 1320 and an interior 1322. Examples of the plurality of systems 1320 include one or more of a propulsion system 1324, an electrical system 1326, an environmental system 1328, and a hydraulic system 1330. Any number of other systems may be included. For example, the systems 1320 can include the wire(s) 1222 in the bundle(s) 1220. In this example, one or more of the wire(s) 1222 are routed according to the method 100 of FIG. 1.

FIG. 14 is a block diagram of a computing environment 1400 including a computing device 1410 configured to support aspects of computer-implemented methods and computer-executable program instructions (or code) according to the present disclosure. For example, the computing device 1410, or portions thereof, is configured to execute instructions to initiate, perform, or control one or more operations described with reference to FIGS. 1-13.

The computing device 1410 includes the processor(s) 260. The processor(s) 260 are configured to communicate with system memory 1430, one or more storage devices 1440, one or more input/output interfaces 1450, one or more communications interfaces 1460, or any combination thereof. The system memory 1430 includes volatile memory devices (e.g., random access memory (RAM) devices), nonvolatile memory devices (e.g., read-only memory (ROM) devices, programmable read-only memory, and flash memory), or both. The system memory 1430 stores an operating system 1432, which may include a basic input/output system for booting the computing device 1410 as well as a full operating system to enable the computing device 1410 to interact with users, other programs, and other devices. The system memory 1430 stores system (program) data 1436, such as the transmission line model 234.

The system memory 1430 includes one or more applications 1434 (e.g., sets of instructions) executable by the processor(s) 260. As an example, the one or more applications 1434 include instructions executable by the processor(s) 260 to initiate, control, or perform one or more operations described with reference to FIGS. 1-13. To illustrate, the one or more applications 1434 include instructions executable by the processor(s) 260 to initiate, control, or perform one or more operations described with reference to the query generator 202, the parameter calculator 222, the model generator 224, the comparator 238, the validator 256, or a combination thereof.

In a particular implementation, the system memory 1430 includes a non-transitory, computer-readable medium (e.g., a computer-readable storage device) storing the instructions that, when executed by the processor(s) 260, cause the processor(s) 260 to initiate, perform, or control operations to determine a bundle to route one or more wires or to evaluate the routing of a wire based on an acceptance criterion. For example, the operations may include obtaining data specifying one or more wires to be routed in an aircraft and selecting, from aircraft design data retrieved from an aircraft design database, one or more wire bundles that are candidates for routing the one or more wires. In this example, the operations also include determining bundle parameters for each of the one or more wire bundles, where the bundle parameters for a particular wire bundle include wire data for each wire of the particular wire bundle and shield information for the particular wire bundle. In this example, the operations further include, for each wire bundle of the one or more wire bundles, generating a transmission line model to determine an estimated effect of an electromagnetic disturbance on the wire bundle. In this example, the operations also include performing a comparison of the estimated effect of the electromagnetic disturbance on each wire bundle to an acceptance criterion. In this example, the operations further include generating output indicating whether, based on the comparison, a particular routing of the one or more wires satisfies a design specification.

The one or more storage devices 1440 include nonvolatile storage devices, such as magnetic disks, optical disks, or flash memory devices. In a particular example, the storage devices 1440 include both removable and non-removable memory devices. The storage devices 1440 are configured to store an operating system, images of operating systems, applications (e.g., one or more of the applications 1434), and program data (e.g., the program data 1436). In a particular aspect, the system memory 1430, the storage devices 1440, or both, include tangible, non-transitory computer-readable media. In a particular aspect, one or more of the storage devices 1440 are external to the computing device 1410.

The one or more input/output interfaces 1450 enable the computing device 1410 to communicate with one or more input/output devices 1470 to facilitate user interaction. For example, the one or more input/output interfaces 1450 can include a display interface, an input interface, or both. For example, the input/output interface 1450 is adapted to receive input from a user, to receive input from another computing device, or a combination thereof. To illustrate, the input may include, for example, one or more wire identifiers (such as the wire identifier(s) 102 of FIG. 1), analysis parameters (such as the analysis parameters 120 of FIG. 1), an aircraft identifier (such as the aircraft identifier(s) 206 of FIG. 2), an acceptance criterion (such as the acceptance criterion 240 of FIG. 2), one or more wire run identifiers (such as the wire run identifier(s) 302 of FIG. 3), a height above a ground plane (such as the height above ground plane 706 of FIG. 7), a frequency of interest (such as the frequency of interest 708 of FIG. 7), an analysis location (such as the analysis location(s) 802 of FIG. 8), external source data (such as the external source data 806 of FIG. 8), or any combination thereof.

In some implementations, the input/output interface 1450 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1470 includes one or more user interface devices and displays, including some combination of sensors, the display devices, buttons, keyboards, pointing devices, displays, speakers, microphones, touch screens, and other devices.

The processor(s) 260 are configured to communicate with devices or controllers 1480 via the one or more communications interfaces 1460. For example, the one or more communications interfaces 1460 can include a network interface. The devices or controllers 1480 can include, for example, the aircraft design database 204.

In some implementations, a non-transitory, computer-readable medium stores instructions that, when executed by one or more processors 260, cause the one or more processors 260 to initiate, perform, or control operations to perform part or all of the functionality described above. For example, the instructions may be executable to implement one or more of the operations or methods of FIGS. 1-13. In some implementations, part or all of one or more of the operations or methods of FIGS. 1-13 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Aspects of the disclosure are described further with reference to the following set of interrelated clauses:

Clause 1 includes a method including: obtaining, by one or more processors, data specifying one or more wires to be routed in an aircraft; selecting, by the one or more processors from aircraft design data retrieved from an aircraft design database, one or more wire bundles that are candidates for routing the one or more wires; determining, by the one or more processors, bundle parameters for each of the one or more wire bundles, wherein the bundle parameters for a particular wire bundle include wire data for each wire of the particular wire bundle and shield information for the particular wire bundle; for each wire bundle of the one or more wire bundles, generating, by the one or more processors, a transmission line model to determine an estimated effect of an electromagnetic disturbance on the wire bundle; performing, by the one or more processors, a comparison of the estimated effect of the electromagnetic disturbance on of each wire bundle to an acceptance criterion; and generating, by the one or more processors, output indicating whether, based on the comparison, a particular routing of the one or more wires satisfies a design specification.

Clause 2 includes the method of Clause 1, further including obtaining input indicating a threat to be evaluated, wherein the electromagnetic disturbance is based on the threat to be evaluated.

Clause 3 includes the method of Clause 2, wherein the threat to be evaluated includes a lightning strike or an interfering signal.

Clause 4 includes the method of any of Clauses 1 to 3, wherein the output identifies a viable wire type of each of the one or more wires, and wherein the viable wire type corresponds to a wire type that satisfies the design specification when routed via the particular wire bundle of the one or more wire bundles.

Clause 5 includes the method of any of Clauses 1 to 4, wherein the output identifies a viable bundle of the one or more wire bundles, and wherein the viable bundle corresponds to the particular wire bundle of the one or more wire bundles that satisfies the design specification.

Clause 6 includes the method of any of Clauses 1 to 5, wherein the output identifies a viable bundle configuration, and wherein the viable bundle configuration corresponds to a particular wire bundle configuration that satisfies the design specification.

Clause 7 includes the method of any of Clauses 1 to 6, wherein the output identifies a set of viable wire routing parameters, and wherein the set of viable wire routing parameters corresponds to routing parameters of the one or more wires that satisfy the design specification.

Clause 8 includes the method of any of Clauses 1 to 7, wherein the output indicates a validation condition, and wherein the output is considered valid only if the validation condition is satisfied.

Clause 9 includes the method of Clause 8, wherein the validation condition is time-based and is satisfied for a particular duration after generation of the output.

Clause 10 includes the method of Clause 8 or Clause 9, wherein the validation condition is satisfied until particular data of the aircraft design database is modified.

Clause 11 includes the method of any of Clauses 8 to 10, further including periodically or occasionally querying the aircraft design database to determine whether the validation condition is satisfied.

Clause 12 includes the method of any of Clauses 1 to 11, further including receiving input including one or more wire identifiers and an aircraft identifier indicating an aircraft type of the aircraft.

Clause 13 includes the method of any of Clauses 1 to 12, wherein said determining the one or more wire bundles that are candidates for routing the one or more wires includes identifying one or more additional wires that are planned for routing along at least a portion of a path between end points of the one or more wires.

Clause 14 includes the method of Clause 13, wherein the one or more additional wires are identified based on user input.

Clause 15 includes the method of Clause 13, wherein the one or more additional wires are identified based on the aircraft design database.

Clause 16 includes the method of any of Clauses 1 to 15, wherein said determining the bundle parameters for each of the one or more wire bundles includes estimating the bundle parameters based on a determination that the bundle parameters are not specified in the aircraft design database.

Clause 17 includes the method of any of Clauses 1 to 16, further including determining transmission line parameters for each wire of each of the one or more wire bundles.

Clause 18 includes the method of Clause 17, wherein the transmission line parameters for each wire of the particular wire bundle include, for each of one or more frequencies of interest, capacitance values, inductance values, and resistance values.

Clause 19 includes the method of any of Clauses 1 to 18, wherein the estimated effect of the electromagnetic disturbance includes a voltage profile over time responsive to the electromagnetic disturbance, and wherein the acceptance criterion indicates a maximum voltage.

Clause 20 includes the method of any of Clauses 1 to 19, wherein the estimated effect of the electromagnetic disturbance includes a current profile over time responsive to the electromagnetic disturbance, and wherein the acceptance criterion indicates a maximum current.

Clause 21 includes a computing device including: a memory storing instructions; and one or more processors coupled to the memory and configured to execute the instructions to perform operations including: obtaining data specifying one or more wires to be routed in an aircraft; selecting, from aircraft design data retrieved from an aircraft design database, one or more wire bundles that are candidates for routing the one or more wires; determining bundle parameters for each of the one or more wire bundles, wherein the bundle parameters for a particular wire bundle include wire data for each wire of the particular wire bundle and shield information for the particular wire bundle; for each wire bundle of the one or more wire bundles, generating a transmission line model to determine an estimated effect of an electromagnetic disturbance on the wire bundle; performing a comparison of the estimated effect of the electromagnetic disturbance on of each wire bundle to an acceptance criterion; and generating output indicating whether, based on the comparison, a particular routing of the one or more wires satisfies a design specification.

Clause 22 includes the computing device of Clause 21, wherein the operations further include obtaining input indicating a threat to be evaluated, wherein the electromagnetic disturbance is based on the threat to be evaluated.

Clause 23 includes the computing device of Clause 22, wherein the threat to be evaluated includes a lightning strike or an interfering signal.

Clause 24 includes the computing device of any of Clauses 21 to 23, wherein the output identifies a viable wire type of each of the one or more wires, and wherein the viable wire type corresponds to a wire type that satisfies the design specification when routed via the particular wire bundle of the one or more wire bundles.

Clause 25 includes the computing device of Clauses 21 to 24, wherein the output identifies a viable bundle of the one or more wire bundles, and wherein the viable bundle corresponds to the particular wire bundle of the one or more wire bundles that satisfies the design specification.

Clause 26 includes the computing device of Clauses 21 to 25, wherein the output identifies a viable bundle configuration, and wherein the viable bundle configuration corresponds to a particular wire bundle configuration that satisfies the design specification.

Clause 27 includes the computing device of Clauses 21 to 26, wherein the output identifies a set of viable wire routing parameters, and wherein the set of viable wire routing parameters corresponds to routing parameters of the one or more wires that satisfy the design specification.

Clause 28 includes the computing device of Clauses 21 to 27, wherein the output indicates a validation condition, and wherein the output is considered valid only if the validation condition is satisfied.

Clause 29 includes the computing device of Clause 28, wherein the validation condition is time-based and is satisfied for a particular duration after generation of the output.

Clause 30 includes the computing device of Clause 28 or Clause 29, wherein the validation condition is satisfied until particular data of the aircraft design database is modified.

Clause 31 includes the computing device of Clauses 28 to 30, wherein the operations further include periodically or occasionally querying the aircraft design database to determine whether the validation condition is satisfied.

Clause 32 includes the computing device of Clauses 21 to 31, wherein the operations further include receiving input including one or more wire identifiers and an aircraft identifier indicating an aircraft type of the aircraft.

Clause 33 includes the computing device of Clauses 21 to 32, wherein said determining the one or more wire bundles that are candidates for routing the one or more wires includes identifying one or more additional wires that are planned for routing along at least a portion of a path between end points of the one or more wires.

Clause 34 includes the computing device of Clause 33, wherein the one or more additional wires are identified based on user input.

Clause 35 includes the computing device of Clause 33, wherein the one or more additional wires are identified based on the aircraft design database.

Clause 36 includes the computing device of Clauses 21 to 35, wherein said determining the bundle parameters for each of the one or more wire bundles includes estimating the bundle parameters based on a determination that the bundle parameters are not specified in the aircraft design database.

Clause 37 includes the computing device of Clauses 21 to 36, wherein the operations further include determining transmission line parameters for each wire of each of the one or more wire bundles.

Clause 38 includes the computing device of Clause 37, wherein the transmission line parameters for each wire of the particular wire bundle include, for each of one or more frequencies of interest, capacitance values, inductance values, and resistance values.

Clause 39 includes the computing device of Clauses 21 to 38, wherein the estimated effect of the electromagnetic disturbance includes a voltage profile over time responsive to the electromagnetic disturbance, and wherein the acceptance criterion indicates a maximum voltage.

Clause 40 includes the computing device of Clauses 21 to 39, wherein the estimated effect of the electromagnetic disturbance includes a current profile over time responsive to the electromagnetic disturbance, and wherein the acceptance criterion indicates a maximum current.

Clause 41 includes a non-transitory computer-readable storage device storing instructions that are executable by one or more processors to cause the one or more processors to perform operations including: obtaining data specifying one or more wires to be routed in an aircraft; selecting, from aircraft design data retrieved from an aircraft design database, one or more wire bundles that are candidates for routing the one or more wires; determining bundle parameters for each of the one or more wire bundles, wherein the bundle parameters for a particular wire bundle include wire data for each wire of the particular wire bundle and shield information for the particular wire bundle; for each wire bundle of the one or more wire bundles, generating a transmission line model to determine an estimated effect of an electromagnetic disturbance on the wire bundle; performing a comparison of the estimated effect of the electromagnetic disturbance on of each wire bundle to an acceptance criterion; and generating output indicating whether, based on the comparison, a particular routing of the one or more wires satisfies a design specification.

Clause 42 includes the non-transitory computer-readable storage device of Clause 41, wherein the operations further include obtaining input indicating a threat to be evaluated, wherein the electromagnetic disturbance is based on the threat to be evaluated.

Clause 43 includes the non-transitory computer-readable storage device of Clause 42, wherein the threat to be evaluated includes a lightning strike or an interfering signal.

Clause 44 includes the non-transitory computer-readable storage device of Clauses 41 to 43, wherein the output identifies a viable wire type of each of the one or more wires, and wherein the viable wire type corresponds to a wire type that satisfies the design specification when routed via the particular wire bundle of the one or more wire bundles.

Clause 45 includes the non-transitory computer-readable storage device of Clauses 41 to 44, wherein the output identifies a viable bundle of the one or more wire bundles, and wherein the viable bundle corresponds to the particular wire bundle of the one or more wire bundles that satisfies the design specification.

Clause 46 includes the non-transitory computer-readable storage device of Clauses 41 to 45, wherein the output identifies a viable bundle configuration, and wherein the viable bundle configuration corresponds to a particular wire bundle configuration that satisfies the design specification.

Clause 47 includes the non-transitory computer-readable storage device of Clauses 41 to 46, wherein the output identifies a set of viable wire routing parameters, and wherein the set of viable wire routing parameters corresponds to routing parameters of the one or more wires that satisfy the design specification.

Clause 48 includes the non-transitory computer-readable storage device of Clauses 41 to 47, wherein the output indicates a validation condition, and wherein the output is considered valid only if the validation condition is satisfied.

Clause 49 includes the non-transitory computer-readable storage device of Clause 48, wherein the validation condition is time-based and is satisfied for a particular duration after generation of the output.

Clause 50 includes the non-transitory computer-readable storage device of Clause 48 or Clause 49, wherein the validation condition is satisfied until particular data of the aircraft design database is modified.

Clause 51 includes the non-transitory computer-readable storage device of Clauses 48 to 50, wherein the operations further include periodically or occasionally querying the aircraft design database to determine whether the validation condition is satisfied.

Clause 52 includes the non-transitory computer-readable storage device of Clauses 41 to 51, wherein the operations further include receiving input including one or more wire identifiers and an aircraft identifier indicating an aircraft type of the aircraft.

Clause 53 includes the non-transitory computer-readable storage device of Clauses 41 to 53, wherein said determining the one or more wire bundles that are candidates for routing the one or more wires includes identifying one or more additional wires that are planned for routing along at least a portion of a path between end points of the one or more wires.

Clause 54 includes the non-transitory computer-readable storage device of Clause 53, wherein the one or more additional wires are identified based on user input.

Clause 55 includes the non-transitory computer-readable storage device of Clause 53, wherein the one or more additional wires are identified based on the aircraft design database.

Clause 56 includes the non-transitory computer-readable storage device of Clauses 41 to 55, wherein said determining the bundle parameters for each of the one or more wire bundles includes estimating the bundle parameters based on a determination that the bundle parameters are not specified in the aircraft design database.

Clause 57 includes the non-transitory computer-readable storage device of Clauses 41 to 56, wherein the operations further include determining transmission line parameters for each wire of each of the one or more wire bundles.

Clause 58 includes the non-transitory computer-readable storage device of Clause 57, wherein the transmission line parameters for each wire of the particular wire bundle include, for each of one or more frequencies of interest, capacitance values, inductance values, and resistance values.

Clause 59 includes the non-transitory computer-readable storage device of Clauses 41 to 58, wherein the estimated effect of the electromagnetic disturbance includes a voltage profile over time responsive to the electromagnetic disturbance, and wherein the acceptance criterion indicates a maximum voltage.

Clause 60 includes the non-transitory computer-readable storage device of Clauses 41 to 59, wherein the estimated effect of the electromagnetic disturbance includes a current profile over time responsive to the electromagnetic disturbance, and wherein the acceptance criterion indicates a maximum current.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A computing device comprising:
a memory storing instructions; and
one or more processors coupled to the memory and configured to execute the instructions to perform operations comprising:
obtaining data specifying one or more wires to be routed in an aircraft;
selecting, from aircraft design data retrieved from an aircraft design database, one or more wire bundles that are candidates for routing the one or more wires;
determining bundle parameters for each of the one or more wire bundles, wherein the bundle parameters for a particular wire bundle include wire data for each wire of the particular wire bundle and shield information for the particular wire bundle, wherein the determining of the bundle parameters for each of the one or more wire bundles comprises estimating the bundle parameters based on a determination that the bundle parameters are not specified in the aircraft design database;

for each wire bundle of the one or more wire bundles, generating a transmission line model to determine an estimated effect of an electromagnetic disturbance on the wire bundle;

performing a comparison of the estimated effect of the electromagnetic disturbance on each wire bundle to a threshold value;

generating output indicating whether, based on the comparison, a particular routing of the one or more wires satisfies a design specification; and providing the output to control physical assembly of the one or more wires into the one or more wire bundles.

2. The computing device of claim 1, wherein the electromagnetic disturbance is based on a threat to be evaluated, and wherein the threat to be evaluated includes a lightning strike or an interfering signal.

3. The computing device of claim 1, wherein the output identifies at least one of a viable wire type of each of the one or more wires, a viable bundle of the one or more wire bundles, or a viable bundle configuration.

4. The computing device of claim 1, wherein the operations further comprise determining transmission line parameters for each wire of each of the one or more wire bundles, and wherein the transmission line parameters for each wire of a particular wire bundle comprise, for each of one or more frequencies of interest, capacitance values, inductance values, and resistance values.

5. A non-transitory computer-readable storage device storing instructions that are executable by one or more processors to cause the one or more processors to perform operations comprising:

obtaining data specifying one or more wires to be routed in an aircraft;

selecting, from aircraft design data retrieved from an aircraft design database, one or more wire bundles that are candidates for routing the one or more wires;

determining bundle parameters for each of the one or more wire bundles, wherein the bundle parameters for a particular wire bundle include wire data for each wire of the particular wire bundle and shield information for the particular wire bundle, and wherein said determining the bundle parameters comprises estimating the bundle parameters based on a determination that the bundle parameters are not specified in the aircraft design database;

for each wire bundle of the one or more wire bundles, generating a transmission line model to determine an estimated effect of an electromagnetic disturbance on the wire bundle;

performing a comparison of the estimated effect of the electromagnetic disturbance on each wire bundle to a threshold value;

generating output indicating whether, based on the comparison, a particular routing of the one or more wires satisfies a design specification; and providing the output to control physical assembly of the one or more wires into the one or more wire bundles.

6. The non-transitory computer-readable storage device of claim 5, wherein the output indicates a validation condition, and wherein the output is considered valid only if the validation condition is satisfied.

7. The non-transitory computer-readable storage device of claim 6, wherein the validation condition is time-based and is satisfied for a particular duration after generation of the output.

8. The non-transitory computer-readable storage device of claim 6, wherein the validation condition is satisfied until particular data of the aircraft design database is modified.

9. The non-transitory computer-readable storage device of claim 6, wherein the operations further comprise periodically or occasionally querying the aircraft design database to determine whether the validation condition is satisfied.

10. The non-transitory computer-readable storage device of claim 5, wherein said determining the one or more wire bundles that are candidates for routing the one or more wires comprises identifying one or more additional wires that are planned for routing along at least a portion of a path between end points of the one or more wires.

11. The non-transitory computer-readable storage device of claim 5, wherein the estimated effect of the electromagnetic disturbance includes a voltage profile over time responsive to the electromagnetic disturbance, and wherein the threshold value indicates a maximum voltage.

12. The non-transitory computer-readable storage device of claim 5, wherein the estimated effect of the electromagnetic disturbance includes a current profile over time responsive to the electromagnetic disturbance, and wherein the threshold value indicates a maximum current.

13. A method comprising:

obtaining, by one or more processors, data specifying one or more wires to be routed in an aircraft;

selecting, by the one or more processors from aircraft design data retrieved from an aircraft design database, one or more wire bundles that are candidates for routing the one or more wires;

determining, by the one or more processors, bundle parameters for each of the one or more wire bundles, wherein the bundle parameters for a particular wire bundle include wire data for each wire of the particular wire bundle and shield information for the particular wire bundle, and wherein said determining the bundle parameters comprises estimating the bundle parameters based on a determination that the bundle parameters are not specified in the aircraft design database;

for each wire bundle of the one or more wire bundles, generating, by the one or more processors, a transmission line model to determine an estimated effect of an electromagnetic disturbance on the wire bundle;

performing, by the one or more processors, a comparison of the estimated effect of the electromagnetic disturbance on each wire bundle to a threshold value;

generating, by the one or more processors, output indicating whether, based on the comparison, a particular routing of the one or more wires satisfies a design specification; and providing the output to control physical assembly of the one or more wires into the one or more wire bundles.

14. The method of claim 13, further comprising obtaining input indicating a threat to be evaluated, wherein the electromagnetic disturbance is based on the threat to be evaluated.

15. The method of claim 13, wherein the output indicates a validation condition, and wherein the output is considered valid only if the validation condition is satisfied.

16. The method of claim 15, further comprising querying the aircraft design database to validate the output based on a determination that particular data of the aircraft design database has changed.

17. The method of claim 13, wherein the estimated effect of the electromagnetic disturbance includes a voltage profile over time responsive to the electromagnetic disturbance, and wherein the threshold value indicates a maximum voltage.

18. The method of claim 13, wherein the estimated effect of the electromagnetic disturbance includes a current profile over time responsive to the electromagnetic disturbance, and wherein the threshold value indicates a maximum current.

\* \* \* \* \*